(12) United States Patent
Anzai et al.

(10) Patent No.: US 11,892,627 B2
(45) Date of Patent: Feb. 6, 2024

(54) PROJECTION IMAGE DISPLAY MEMBER, WINDSHIELD GLASS, AND HEAD-UP DISPLAY SYSTEM

(71) Applicant: FUJIFILM Corporation, Tokyo (JP)

(72) Inventors: Akihiro Anzai, Minami-ashigara (JP); Yujiro Yanai, Minami-ashigara (JP); Wataru Majima, Minami-ashigara (JP); Taketo Otani, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 345 days.

(21) Appl. No.: 17/232,997

(22) Filed: Apr. 16, 2021

(65) Prior Publication Data

US 2021/0263314 A1 Aug. 26, 2021

Related U.S. Application Data

(63) Continuation of application No. PCT/JP2019/040471, filed on Oct. 15, 2019.

(30) Foreign Application Priority Data

Oct. 17, 2018 (JP) .................................. 2018-196114
Sep. 27, 2019 (JP) .................................. 2019-177536

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 5/26* (2013.01); (Continued)

(58) Field of Classification Search
CPC ..... G02B 27/00–648; G02B 2027/0105–0198; G02B 5/00–32;
(Continued)

(56) References Cited

U.S. PATENT DOCUMENTS

2005/0206818 A1 9/2005 Hayashi
2016/0091756 A1* 3/2016 Watano ............... G02B 5/30
349/185
(Continued)

FOREIGN PATENT DOCUMENTS

CN 106415335 A 2/2017
CN 106716229 A 5/2017
(Continued)

OTHER PUBLICATIONS

Chinese Office Action and Search Report for corresponding Chinese Application No. 201980067444.8, dated Jun. 14, 2022, with an English translation.

(Continued)

*Primary Examiner* — Bao-Luan Q Le
*Assistant Examiner* — Christopher A Lamb, II
(74) *Attorney, Agent, or Firm* — Birch, Stewart, Kolasch & Birch, LLP

(57) ABSTRACT

Provided are a projection image display member having a high visible light transmittance, suppressing a double image of a display image, and having excellent suitability of polarized sunglasses for incident light reflected from external light, a windshield glass using the projection image display member, and a head-up display system. The problem is solved such that one or more phase difference layers, one or more selective reflection layers, and one or more polarization conversion layers are provided in this order, the polarization conversion layer being a layer in which a helical alignment structure of a liquid crystal compound is fixed, and the number of pitches x of the helical alignment structure and a film thickness y (μm) of the polarization conversion layer satisfying "0.3≤x≤7.0", "0.5≤y≤6.0", "y≤0.7x+3.2", and "y≥0.7x−1.4".

12 Claims, 2 Drawing Sheets

(51) Int. Cl.
*G02B 5/26* (2006.01)
*G02B 5/30* (2006.01)

(52) U.S. Cl.
CPC .... *G02B 5/3016* (2013.01); *B60K 2370/1529* (2019.05); *B60K 2370/31* (2019.05)

(58) Field of Classification Search
CPC ................... G02B 5/26; G02B 5/3016; B60K 2370/00–98; B60K 35/00
See application file for complete search history.

(56) References Cited

U.S. PATENT DOCUMENTS

| | | |
|---|---|---|
| 2017/0192231 A1 | 7/2017 | Ichihashi et al. |
| 2017/0235030 A1 | 8/2017 | Tanaka et al. |
| 2017/0343806 A1 | 11/2017 | Anzai et al. |
| 2017/0343807 A1 | 11/2017 | Anzai et al. |
| 2018/0215843 A1 | 8/2018 | Hoshino et al. |
| 2018/0370851 A1 | 12/2018 | Yoshizawa et al. |
| 2019/0072766 A1 | 3/2019 | Anzai |
| 2019/0091970 A1 | 3/2019 | Ueki et al. |
| 2019/0137818 A1 | 5/2019 | Saito et al. |

FOREIGN PATENT DOCUMENTS

| | | |
|---|---|---|
| CN | 107209389 A | 9/2017 |
| CN | 107250890 A | 10/2017 |
| JP | 2005-215631 A | 8/2005 |
| JP | 2010-152152 A | 7/2010 |
| JP | 2010-211007 A | 9/2010 |
| JP | 2012-219168 A | 11/2012 |
| JP | 2013-72985 A | 4/2013 |
| JP | 2014-228594 A | 12/2014 |
| JP | 2016-71078 A | 5/2016 |
| JP | 2017-187685 A | 10/2017 |
| WO | WO 2015/147243 A1 | 10/2015 |
| WO | WO 2016/056617 A1 | 4/2016 |
| WO | WO 2016/133186 A1 | 8/2016 |
| WO | WO 2017/057316 A1 | 4/2017 |
| WO | WO 2017/150133 A1 | 9/2017 |
| WO | WO 2017/204228 A1 | 11/2017 |
| WO | WO 2017/212755 A1 | 12/2017 |
| WO | WO 2017/221993 A1 | 12/2017 |
| WO | WO 2018/110066 A1 | 6/2018 |

OTHER PUBLICATIONS

Japanese Decision of Refusal for corresponding Japanese Application No. 2020-553194, dated May 24, 2022, with an English translation.
Extended European Search Report issued in corresponding European Application No. 19874688.5 dated Nov. 12, 2021.
Notice of Reasons for Refusal issued in corresponding Japanese Patent Application No. 2020-553194 dated Nov. 16, 2021, with an English translation.
International Preliminary Report on Patentability and Written Opinion of the International Searching Authority (Forms PCT/IB/326, PCT/IB/373 and PCT/ISA/237) for corresponding International Application No. PCT/JP2019/040471, dated Apr. 29, 2021, with English translation.
International Search Report (Form PCT/ISA/210) for corresponding International Application No. PCT/JP2019/040471, dated Dec. 17, 2019, with English translation.
Japanese Notice of Reasons for Refusal for corresponding Japanese Application No. 2022-131647; dated Aug. 1, 2023, with an English translation.

* cited by examiner

PROJECTION IMAGE DISPLAY MEMBER, WINDSHIELD GLASS, AND HEAD-UP DISPLAY SYSTEM

CROSS-REFERENCE TO RELATED APPLICATIONS

This application is a Continuation of PCT International Application No. PCT/JP2019/040471 filed on Oct. 15, 2019, which claims priority under 35 U.S.C. § 119(a) to Japanese Patent Application No. 2018-196114 filed on Oct. 17, 2018 and Japanese Patent Application No. 2019-177536 filed on Sep. 27, 2019. Each of the above applications is hereby expressly incorporated by reference, in its entirety, into the present application.

BACKGROUND OF THE INVENTION

1. Field of the Invention

The present invention relates to a projection image display member capable of being used as a combiner of a head-up display system, a windshield glass having this projection image display member, and a head-up display system. In particular, the present invention relates to a projection image display member including a selective reflection layer that reflects light in a wavelength selective manner, a windshield glass having this projection image display member, and a head-up display system.

2. Description of the Related Art

Recently, it is known as a so-called head-up display or head-up display system for providing various pieces of information such as maps, traveling speed, or vehicle conditions to a driver by projecting images on a windshield glass of a vehicle or the like.

With the head-up display system, virtual images of images including the above described various pieces of information projected on the windshield glass are observed by the driver or the like. A virtual image formation position is positioned on the driver's field of the vehicle outer side than the windshield glass. The virtual image formation position is usually positioned at the driver's field more than 1000 mm away from the windshield glass, and the outer side than the windshield glass. Therefore, the driver can obtain the above described various pieces of information while looking at the outer side in driver's field without significantly moving his/her line of sight. Thus, in a case of using the head-up display system, it is expected to drive more safely while obtaining various pieces of information.

The head-up display system can be configured to form a projection image display member on the windshield glass using a half-mirror film. Various half-mirror films that can be used in the head-up display system are proposed.

It is described in WO2016/056617A that a light reflecting film includes at least two light reflecting layers that are laminated, the at least two light reflecting layers including at least one of light reflecting layers among a light reflecting layer PRL-1, a light reflecting layer PRL-2 and a light reflecting layer PRL-3, the light reflecting layer PRL-1 having a central reflection wavelength of greater than or equal to 400 nm but less than 500 nm and a reflectance to ordinary light at the central reflection wavelength of greater than or equal to 5% but less than or equal to 25%, the light reflecting layer PRL-2 having a central reflection wavelength of greater than or equal to 500 nm but less than 600 nm and a reflectance to ordinary light at the central reflection wavelength of greater than or equal to 5% but less than or equal to 25%, the light reflecting layer PRL-3 having a central reflection wavelength of greater than or equal to 600 nm but less than 700 nm and a reflectance to ordinary light at the central reflection wavelength of greater than or equal to 5% but less than or equal to 25%, the at least two light reflecting layers having central reflection wavelengths that are different from each other, and all of the at least two light reflecting layers that are laminated having a property of reflecting polarization that has the same orientation.

It is described in JP2017-187685A that a light reflecting film includes at least two light reflecting layers that are laminated, the at least two light reflecting layers including at least one of light reflecting layers among a light reflecting layer PRL-1, a light reflecting layer PRL-2 and a light reflecting layer PRL-3, the light reflecting layer PRL-1 having a planar shape and a central reflection wavelength of greater than or equal to 400 nm but less than 500 nm and a reflectance to ordinary light at the central reflection wavelength of greater than or equal to 5% but less than or equal to 25%, the light reflecting layer PRL-2 having a planar shape and a central reflection wavelength of greater than or equal to 500 nm but less than 600 nm and a reflectance to ordinary light at the central reflection wavelength of greater than or equal to 5% but less than or equal to 25%, the light reflecting layer PRL-3 having a planar shape and a central reflection wavelength of greater than or equal to 600 nm but less than 700 nm and a reflectance to ordinary light at the central reflection wavelength of greater than or equal to 5% but less than or equal to 25%, the at least two light reflecting layers having central reflection wavelengths that are different from each other, and all of the at least two light reflecting layers that are laminated having a property of reflecting polarization that has the same orientation, and that has a curved shape and a thickness of greater than or equal to 50 µm but less than or equal to 500 µm.

In both the light reflecting films described in WO2016/056617A and JP2017-187685A, each light reflecting layer has a high reflectance with respect to the light emitted from image display unit converted into specific polarization. It is described in WO2016/056617A and JP2017-187685A that these light reflecting films are used in head-up display systems.

SUMMARY OF THE INVENTION

Each of the light reflecting films described in WO2016/056617A and JP2017-187685A is incorporated in, for example, a windshield glass to form a head-up display system. The windshield glass (combiner) constituting the head-up display system is required to have a high visible light transmittance and to be able to visually recognize an image even though a driver wears polarized sunglasses.

Light reflected by a bonnet or a puddle on a road surface, which hinders driving, is mainly s-polarization. On the other hand, the polarized sunglasses have the function of shielding s-polarization. Therefore, by wearing the polarized sunglasses, the glare of light reflected by a bonnet of an oncoming vehicle or a puddle, which hinders driving, cannot be seen.

Here, the light reflecting films described in WO2016/056617A and JP2017-187685A reflect p-polarization in order to display projection images with the p-polarization. Therefore, images of the head-up display system can be visually recognized even in a case of wearing polarized sunglasses that shield s-polarization.

However, in a case where the s-polarization entering through the windshield glass of the vehicle outer side passes through the light reflecting film in the windshield glass, polarization of the light changes, so that a component of the p-polarization is mixed. As described above, since the polarized sunglasses shield the s-polarization, this component of the p-polarization transmits the polarized sunglasses. Therefore, in the head-up display system displaying the projection images with the p-polarization, there is a problem that the function of the polarized sunglasses to cut the glare of the reflected light that is mainly composed of s-polarization is impaired, which hinders driving.

An object of the present invention is to provide a projection image display member having a high visible light transmittance, suppressing a double image of a display image, and having excellent suitability of polarized sunglasses for incident light reflected from external light, a windshield glass using the projection image display member, and a head-up display system.

[1] A projection image display member comprising, in the following order: at least one phase difference layer; at least one selective reflection layer; and at least one polarization conversion layer, in which the polarization conversion layer is a layer in which a helical alignment structure of a liquid crystal compound is fixed, the number of pitches x of the helical alignment structure and a film thickness y (unit of μm) of the polarization conversion layer satisfy all of the following Relational Expressions, $$0.3 \le x \le 7.0, \quad (i)$$

$$0.5 \le y \le 6.0, \quad (ii)$$

$$y \le 0.7x + 3.2, \quad (iii)$$

and $$y \ge 0.7x - 1.4. \quad (iv)$$

[2] The projection image display member according to [1], in which the number of pitches x of the helical alignment structure and the film thickness y (unit of μm) of the polarization conversion layer satisfy all of Relational Expressions, $$0.3 \le x \le 1.2, \quad (v)$$

$$1.0 \le y \le 3.0, \quad (vi)$$

and $$y \ge 1.875x. \quad (vii)$$

[3] The projection image display member according to [1] or [2], in which the selective reflection layer has at least one reflectance peak at a wavelength of 500 to 700 nm and at least one reflectance peak at a wavelength of 700 to 900 nm, with respect to incident light having an incident angle of 5°.

[4] The projection image display member according to any one of [1] to [3], in which the phase difference layer has a front phase difference of 100 to 450 nm at a wavelength of 550 nm.

[5] A windshield glass comprising: a first glass plate; a second glass plate; and the projection image display member according to any one of [1] to [4] between the first glass plate and the second glass plate.

[6] A head-up display system comprising: the windshield glass according to [5]; and a projector emitting projection light of p-polarization from the phase difference layer side of the projection image display member of the windshield glass.

According to the present invention, the windshield glass including the projection image display member is provided.

According to the windshield glass of the present invention, it is preferable that the projection image display member is disposed between the first glass plate and the second glass plate.

According to the windshield glass of the present invention, an intermediate film is preferably provided on at least one between the first glass plate and the projection image display member, or between the projection image display member and the second glass plate.

According to the present invention, the head-up display system including the projection image display member is provided.

The head-up display system of the present invention includes the windshield glass including the projection image display member disposed between the first glass plate and the second glass plate, and includes the projector emitting projection light as p-polarization to the windshield glass.

In the windshield glass, the intermediate film is preferably provided on at least one between the first glass plate and the projection image display member, or between the projection image display member and the second glass plate.

According to the present invention, it is possible to provide the projection image display member having a high visible light transmittance, suppressing a double image, and having good suitability of polarized sunglasses, the windshield glass, and the head-up display system.

DESCRIPTION OF THE PREFERRED EMBODIMENTS

Figure 1:
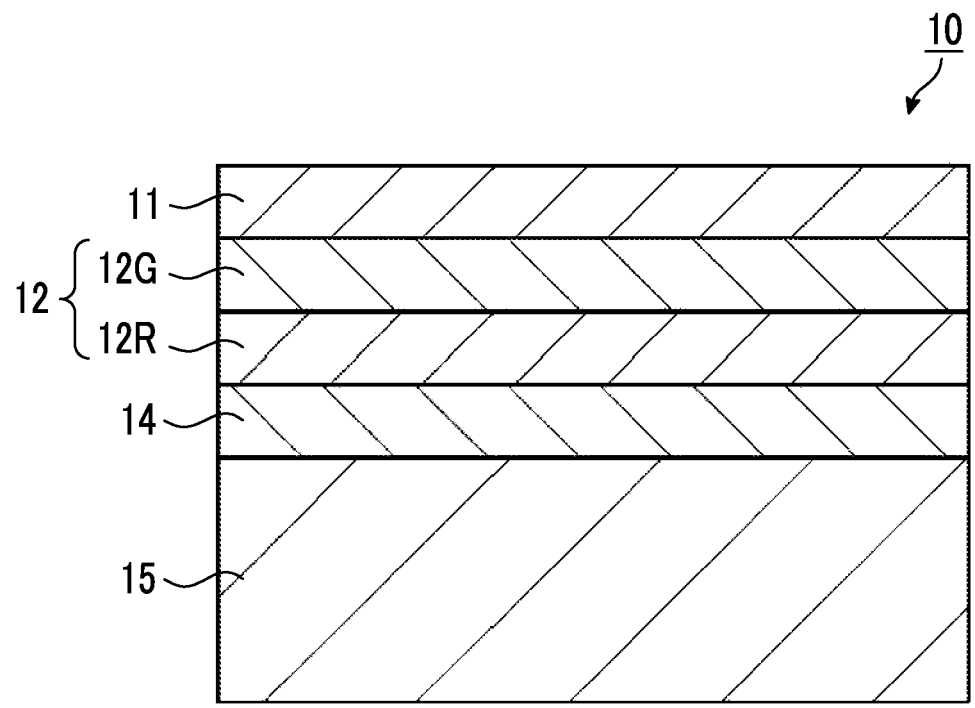
FIG. 1 is a schematic diagram illustrating an example of a projection image display member according to an embodiment of the present invention.

Hereinafter, a projection image display member, a windshield glass, and a head-up display system according to an embodiment of the present invention will be described in detail based on preferred embodiments illustrated in the accompanying drawings.

The figures described below are exemplary for explaining the present invention, and the present invention is not limited to the figures illustrated below.

In the following, "~" indicating the numerical range includes the numerical values described on both sides. For example, $\varepsilon_1$ is the numerical value $\alpha_1$ to the numerical value $\beta_1$ means that the range of $\varepsilon_1$ includes the numerical value $\alpha_1$ and the numerical value $\beta_1$, and in a case of being indicated by mathematical signs, $\alpha_1 \le \varepsilon_1 \le \beta_1$.

Angles such as "angles represented by specific numerical values", "parallel", "vertical", and "orthogonal" include error ranges generally tolerated in the art, unless otherwise described.

The term "the same" includes an error range generally tolerated in the art, and an "entire surface" and the like also include error ranges generally tolerated in the art.

In a case where "selective" is used regarding circular polarization, the light amount of any one of a right circular polarization component or a left circular polarization component of light is more than the light amount of the other circular polarization component. Specifically, in the case where "selective" is used, a degree of circular polarization is preferably 0.3 or more, more preferably 0.6 or more, and even more preferably 0.8 or more. The degree of circular polarization is particularly preferably 1.0, in substance. Here, in a case where the intensity of a right circular polarization component of light is denoted by $I_R$ and the intensity of a left circular polarization component of light is denoted by $I_L$, a degree of circular polarization is a value represented by $|I_R - I_L|/(I_R + I_L)$.

A "sense" regarding the circular polarization means right circular polarization or left circular polarization. In a case of observing light so that light is emitted frontward, the sense of the circular polarization is right circular polarization in a case where the tip of the electric field vector rotates clockwise as the time increases is right circular polarization, whereas the circular polarization in which the tip rotates counterclockwise is left circular polarization.

"sense" may be used in regards to a twisted direction of a helix of a cholesteric liquid crystal. In a case where a twisted direction (sense) of a helix of a cholesteric liquid crystal is right, the cholesteric liquid crystal reflects right circular polarization and transmits left circular polarization, and in a case where the sense is left, the cholesteric liquid crystal reflects left circular polarization and transmits right circular polarization.

"light" means light of visible light and natural light (unpolarization), unless otherwise specified. The visible light is light at a wavelength which is visible to the human eyes, among electromagnetic waves, and is normally light in a wavelength range of 380 to 780 nm. Invisible light is light in a wavelength range of less than 380 nm or in a wavelength range of more than 780 nm.

Although light not limited to this, among the visible light, the light in a wavelength range of 420 to 490 nm is blue (B) light, and the light in a wavelength range of 495 to 570 nm is green (G) light, the light in a wavelength range of 620 to 750 nm is red (R) light.

The term "visible light transmittance" is a visible light transmittance of an A light source defined in JIS (Japanese Industrial Standards) R 3212:2015 (Test methods of safety glazing materials for road vehicles). That is, the transmittance is obtained by measuring a transmittance of each wavelength in a range of 380 to 780 nm with a spectrophotometer using the A light source, multiplying a wavelength distribution of International Commission on Illumination (CIE) photopic spectral luminous efficiency function and pre-calculated weighting functions obtained from an interval wavelength by the transmittance at each wavelength, and performing a weighted average.

In a case of being simply referred to as "reflected light" or "transmitted light", the "reflected light" and "transmitted light" include the meanings of "scattered light" and "diffracted light", respectively.

A polarization state of light at each wavelength can be measured with a spectral radiance meter or a spectrometer on which a circular polarization plate is mounted. In this case, the intensity of light measured through the right circular polarization plate corresponds to $I_R$, and the intensity of light measured through the left circular polarization plate corresponds to $I_L$. In addition, the polarized state can also be measured by attaching the circular polarization plate to an illuminance meter or an optical spectrometer. The right circular polarization amount is measured by attaching a right circular polarization transmission plate thereto, the left circular polarization amount is measured by attaching a left circular polarization transmission plate thereto, and thus, a ratio therebetween can be measured.

p-polarization means polarization that vibrates in a direction parallel to an incidence surface of light. The incidence surface means a surface that is perpendicular to a reflecting surface and contains the incident rays and reflected rays. A vibrating surface of an electric field vector of the p-polarization is parallel to the incidence surface. The reflecting surface is, for example, a windshield glass surface or the like in the case of a head-up display.

A front phase difference is a value measured with AxoScan manufactured by Axometrics, Inc. Unless otherwise specified, a measurement wavelength is set as 550 nm. Regarding the front phase difference, a value measured by emitting light having wavelengths in a visible light wavelength range in a film normal direction by using KOBRA 21ADH or WR (manufactured by Oji Scientific Instruments) can also be used. In a case of selecting a measurement wavelength, a wavelength selective filter can be manually exchanged, or a measurement value is converted using a program or the like to perform the measurement.

The term "projection image" means an image based on projection of light from a projector to be used, which is not a scenery viewed from the driver's position such as the driver's field. The projection image is observed as a virtual image which is observed by an observer as the projection image is floated over the projection image display member of the windshield glass.

The term "screen image" means an image displayed on a drawing device of a projector or an image drawn on an intermediate image screen or the like by a drawing device. Unlike a virtual image, the screen image is a real image.

Both the screen image and the projection image may be monochrome images, multicolor images of two or more colors, or full color images.

<<Projection Image Display Member>>

The projection image display member means a half-mirror that reflects projection light on which the screen image is carried and supported and can display the screen image carried and supported on the projection light as the projection image using the reflected light of the projection light.

The projection image display member has visible light transmission. Specifically, a visible light transmittance of the projection image display member is preferably 80% or more, more preferably 82% or more, and even more preferably 84% or more. By having such a high visible light transmittance, even in a laminated glass in combination with a glass having a low visible light transmittance, it is possible to realize a visible light transmittance satisfying the standard of the windshield glass of a vehicle.

It is preferable that the projection image display member does not exhibit substantial reflection in a wavelength range having a high luminosity factor.

Specifically, in a case where a normal laminated glass and a laminated glass into which a projection image display member is incorporated are compared with respect to light from the normal direction, it is preferable that the projection image display member exhibits substantially equivalent reflection at a wavelength of around 550 nm. In particular, it is preferable to exhibit substantially equivalent reflection in a visible light wavelength range of 490 to 620 nm.

The term "substantially equivalent reflection" means that, for example, a difference in reflectance of natural light (non-polarization) at a target wavelength measured from the normal direction with a spectrophotometer such as a spectrophotometer "V-670" manufactured by JASCO Corporation is 10% or less. In the above described wavelength range, the difference in reflectance is preferably 5% or less, more preferably 3% or less, even more preferably 2% or less, and particularly preferably 1% or less.

Due to the substantially equivalent reflection in a wavelength range having high luminosity factor, even though the laminated glass is formed by combining with a glass having a low visible light transmittance, a visible light transmittance satisfying the standard of a vehicle windshield glass can be realized.

The projection image display member may have a thin film-shape, a sheet-shape, and the like. The projection image display member may be a roll-shape as the thin film-shape before used for a windshield glass.

The projection image display member may have a function as a half-mirror, at least, for a part of projected light. Therefore, the projection image display member does not need to have a function as a half-mirror for light in the entire visible light region.

In addition, the projection image display member may have a function as the half-mirror for light at all incident angles, and may have a function as the half-mirror, at least, for light at some incident angles.

The projection image display member has a selective reflection layer. The projection image display member may have a configuration including a support, an alignment layer, an adhesive layer, and the like, as long as the configuration including a phase difference layer and a polarization conversion layer in addition to the selective reflection layer.

Hereinafter, the projection image display member will be described more specifically.

FIG. 1 is a schematic diagram illustrating an example of a projection image display member according to an embodiment of the present invention.

As illustrated in FIG. 1, in a projection image display member 10, for example, a phase difference layer 14, a selective reflection layer 12, and a polarization conversion layer 11 are laminated in this order on a support 15. The projection image display member 10 may have a configuration including at least the phase difference layer 14, the selective reflection layer 12, and the polarization conversion layer 11. Thus, the projection image display member 10 may not include the support 15.

<Selective Reflection Layer>

The selective reflection layer 12 is a layer that reflects light in a wavelength selective manner described above. Specifically, the selective reflection layer 12 is a layer that selectively reflects light in a specific wavelength range.

The selective reflection layer 12 preferably exhibits selective reflection in a part of the visible light wavelength range. The selective reflection layer 12 may reflect light for displaying a projection image, for example.

The selective reflection layer 12 may have a configuration including a plurality of selective reflection layers corresponding to each wavelength range. For example, the selective reflection layer 12 illustrated in FIG. 1 preferably includes a first selective reflection layer 12G that reflects light having a wavelength of 500 to 700 nm in a wavelength selective manner and a second selective reflection layer 12R that reflects light having a wavelength of 700 to 900 nm in a wavelength selective manner. The first selective reflection layer 12G and the second selective reflection layer 12R are laminated on the support 15 in the order of the first selective reflection layer 12G and the second selective reflection layer 12R from the polarization conversion layer 11 side.

The selective reflection layer 12 is preferably a polarization reflection layer. The polarization reflection layer is a layer that reflects linear polarization, circular polarization, or elliptical polarization.

The polarization reflection layer is preferably a circular polarization reflection layer or a linear polarization reflection layer. The circular polarization reflection layer is a layer that reflects the circular polarization of one sense and transmits the circular polarization of the other sense in a wavelength range where selective reflection occurs. Furthermore, the linear polarization reflection layer is a layer that reflects linear polarization in one polarization direction and transmits linear polarization in a polarization direction orthogonal to the polarization direction, in a selective reflection center wavelength.

The polarization reflection layer can transmit polarization which is not reflected. Therefore, the polarization reflection layer can transmit a part of light even in a wavelength range where the selective reflection layer 12 exhibits reflection. Therefore, by using the polarization reflection layer as the selective reflection layer 12, it is preferable since a tint of light transmitted through the projection image display member 10 is hardly deteriorated and the visible light transmittance is also hardly lowered.

The selective reflection layer 12 preferably includes a cholesteric liquid crystal layer, and may have a configuration including two or more cholesteric liquid crystal layers. That is, in the illustrated example, both the first selective reflection layer 12G and the second selective reflection layer 12R may be cholesteric liquid crystal layers. As will be described later, the cholesteric liquid crystal layer is a layer formed by fixing a cholesteric liquid crystalline phase.

The projection image display member 10 according to the embodiment of the present invention includes a phase difference layer 14.

In a case where the selective reflection layer 12 includes a cholesteric liquid crystal layer, a clear projection image can be displayed by using the phase difference layer 14 in combination with the cholesteric liquid crystal layer. It is possible to provide the projection image display member capable of obtaining high brightness in a case of using the head-up display system, and capable of suppressing a double image, by adjusting the front phase difference and the direction of the slow axis of the phase difference layer 14.

Herein, it is known that the cholesteric liquid crystal layer allows a selective reflection center wavelength of oblique light to shift to shorter wavelengths. The shift of the reflection center wavelength to shorter wavelengths is referred to as blue shift. For oblique light, blue shift occurs in the cholesteric liquid crystal layer since the difference in optical path length between layers decreases through optical interference. Therefore, in a case where observation is performed in an oblique direction, blue shift occurs.

Thus, in a case where the selective reflection layer 12 includes a cholesteric liquid crystal layer, the reflection center wavelength at the front of the selective reflection layer is desirably shifted to longer wavelengths to compensate the amount of shift of the reflection center wavelength to shorter wavelengths in advance. The center wavelength of oblique light is expressed by "center wavelength of oblique light=center wavelength at front×cos θ", where θ represents an angle relative to the front obtained in a case where the oblique light propagates through the selective reflection layer. In consideration of this, the reflection center wavelength can be shifted. The wavelength range of the selective reflection layer 12 described above is set in consideration of blue shift.

[Cholesteric Liquid Crystal Layer (Circular Polarization Reflection Layer)]

The cholesteric liquid crystal layer means a layer obtained by fixing a cholesteric liquid crystalline phase.

The cholesteric liquid crystal layer may be any layer as long as the alignment of a liquid crystal compound serving as a cholesteric liquid crystalline phase is maintained. The cholesteric liquid crystal layer may be typically a layer in which the polymerizable liquid crystal compound may be brought into the alignment state of a cholesteric liquid crystalline phase and polymerized and cured by ultraviolet light irradiation, heating, and the like to form a layer that has no fluidity and also whose alignment state is not changed by an external field or an external force. In the cholesteric liquid crystal layer, optical properties of the cholesteric liquid crystalline phase may be maintained in the layer, and the liquid crystal compound in the layer may not exhibit liquid crystal properties. For example, the polymerizable liquid crystal compound may have high molecular weight due to a curing reaction and lose liquid crystal properties.

It is known that the cholesteric liquid crystalline phase exhibits circular polarization selective reflection of selectively reflecting circular polarization of any one sense of right circular polarization or left circular polarization, and transmitting circular polarization of the other sense.

A large number of films formed of a composition including a polymerizable liquid crystal compound is known in the related art, as a film including a layer obtained by fixing a cholesteric liquid crystalline phase exhibiting circular polarization selective reflection properties, and thus, regarding the cholesteric liquid crystal layer, the technologies of the related art can be referred to.

A center wavelength λ of selective reflection (selective reflection center wavelength k) due to the cholesteric liquid crystal layer depends on a pitch P of a helical structure (helical alignment structure) in a cholesteric liquid crystalline phase, and is based on a relationship between an average refractive index n of the cholesteric liquid crystal layer and λ=n×P. The pitch P of the helical structure is, that is, the period of the helix. As is clear from the above Expression, the selective reflection center wavelength can be controlled by adjusting the n value and/or the P value.

The pitch P of the helical structure (one helical pitch) is, in other words, a length in a helical axial direction for one helical turn. That is, the pitch P of the helical structure is the length in the helical axial direction in which a director (in the case of a rod-shaped liquid crystal, the long axis direction) of the liquid crystal compound that constitutes the cholesteric liquid crystalline phase is rotated by 360°. The helical axial direction of the normal cholesteric liquid crystal layer coincides with a thickness direction of the cholesteric liquid crystal layer.

As an example, the selective reflection center wavelength and a half-width of the cholesteric liquid crystal layer can be obtained as follows.

In a case where the reflection spectrum of the cholesteric liquid crystal layer is measured from a normal direction using a spectrophotometer (manufactured by JASCO Corporation, V-670), a peak having a decreased transmittance is observed in the selective reflection region. Among the two wavelengths that are intermediate (average) transmittance between a minimum transmittance of the peak and a transmittance before the peak transmittance is reduced, assuming that a wavelength value of a shorter wavelength side is set $\lambda_l$ (nm) and a wavelength value of a longer wavelength side is set $\lambda_h$ (nm), the selective reflection center wavelength λ and the half-width Δλ can be expressed by the following expression.

$$\lambda=(\lambda_l+\lambda_h)/2 \Delta\lambda=(\lambda_h-\lambda_l)$$

The selective reflection center wavelength which is obtained as described above substantially coincides with a wavelength at the center of gravity of reflection peak of circular polarization reflection spectra measured in the normal direction of the cholesteric liquid crystal layer.

In the head-up display system described later, the reflectance at the surface of a glass plate on the projection light incidence side can be decreased by using the head-up display system so that light is obliquely incident on the windshield glass.

At this time, light is also obliquely incident on the cholesteric liquid crystal layer constituting the selective reflection layer 12 of the projection image display member 10. For example, light that is incident at an angle of 45° to 70° relative to the normal line of the projection image display member 10 in the air having a refractive index of 1 is transmitted through a cholesteric liquid crystal layer having a refractive index of about 1.61 at an angle of about 26° to 36°. In this case, the reflection wavelength shifts to shorter wavelengths.

In a case where a ray of light passes through a cholesteric liquid crystal layer in which the selective reflection center wavelength is λ at an angle $\theta_2$ with respect to the normal direction of the cholesteric liquid crystal layer, and the selective reflection center wavelength is $\lambda_d$, the wavelength $\lambda_d$ is represented by the following Expression.

$$\lambda_d=\lambda\times\cos\theta_2$$

The normal direction of the cholesteric liquid crystal layer usually coincides with the helical axial direction of the cholesteric liquid crystal layer.

Therefore, the cholesteric liquid crystal layer having a selective reflection center wavelength in a range of 650 to 780 nm at an angle $\theta_2$ of 26° to 36° can reflect projection light in a range of 520 to 695 nm.

Such a wavelength range is a wavelength range with high luminosity factor and thus highly contributes to the brightness of the projection image, and as a result, a projection image with high brightness can be realized.

The helical pitch of the cholesteric liquid crystalline phase depends on a type of chiral agents used together with the polymerizable liquid crystal compound and the addition concentration thereof, and thus, a desired pitch can be obtained by adjusting the type and the addition concentration. As a method of measuring helical sense and pitch, the methods described in "Introduction to Experimental Liquid Crystal Chemistry", edited by The Japanese Liquid Crystal Society, published in 2007 by Sigma Publishing Co., Ltd., p. 46, and "Liquid Crystal Handbook", the Editing Committee of Liquid Crystal Handbook, Maruzen Publishing Co., Ltd., p. 196 can be used.

In the projection image display member, it is preferable that the cholesteric liquid crystal layer is disposed in order from a layer having the shortest selective reflection center wavelength viewed from the visible side. In a case of an in-vehicle head-up display, the visible side is usually the inside of the vehicle.

As each cholesteric liquid crystal layer, a cholesteric liquid crystal layer in which the helical sense is right or left is used. The sense of circular polarization reflected by the cholesteric liquid crystal layer (turning direction of circular polarization) coincides with a helical sense.

In a case where the plurality of cholesteric liquid crystal layers having selective reflection center wavelengths different from each other are provided, a helical sense of each cholesteric liquid crystal layer may be the same as each other or different from each other. However, it is preferable that all of helical senses of the plurality of cholesteric liquid crystal layers are the same as each other.

In a case where the projection image display member 10 includes the plurality of cholesteric liquid crystal layers as the selective reflection layer 12, the projection image display member 10 preferably does not include cholesteric liquid crystal layers having different helical senses as cholesteric liquid crystal layers that exhibit selective reflection in the same or overlapping wavelength range. The reason for this is to avoid a decrease in transmittance to, for example, less than 50% in a specific wavelength range.

A half-width $\Delta\lambda$ (nm) of a selective reflection band exhibiting the selective reflection depends on the birefringence $\Delta n$ of the liquid crystal compound and the pitch P and satisfies a relationship of $\Delta\lambda=\Delta n \times P$. Accordingly, the width of the selective reflection band can be controlled by adjusting the value of $\Delta n$. The value of $\Delta n$ can be adjusted by adjusting the type of the polymerizable liquid crystal compound or a mixing ratio thereof or controlling a temperature at the time of fixing the alignment.

In order to form one type of cholesteric liquid crystal layer having the same selective reflection center wavelength, a plurality of cholesteric liquid crystal layers having the same pitch P and the same helical sense may be laminated. By laminating the cholesteric liquid crystal layers having the same pitch P and the same helical sense, the circular polarization selectivity at a specific wavelength can be increased.

The selective reflection layer 12 preferably includes a cholesteric liquid crystal layer having a reflection wavelength range with a half-width of 150 nm or more within a wavelength range of 540 to 850 nm. In a case where the cholesteric liquid crystal layer has a half-width of 150 nm or more, the selective reflection layer 12 serves as a selective reflection layer that selectively reflects light in a broadband. As a result, in a case where the projection image display member 10 is used in the head-up display system or the like, the brightness of the screen image can be increased.

In the selective reflection layer 12, in a case of laminating the plurality of cholesteric liquid crystal layers, a cholesteric liquid crystal layer that is separately produced may be laminated by using an adhesive and the like. Alternatively, in a case of laminating the plurality of cholesteric liquid crystal layers, a step of directly applying a liquid crystal composition containing a polymerizable liquid crystal compound and the like to the surface of the cholesteric liquid crystal layer formed by a method which will be described later, and allowing alignment and immobilization may be repeatedly performed. The latter method is preferable as the method of laminating a cholesteric liquid crystal layer.

This is because, by directly forming a subsequent cholesteric liquid crystal layer to the surface of a cholesteric liquid crystal layer formed in advance, an alignment direction of liquid crystal molecules on an air interface side of the cholesteric liquid crystal layer formed in advance and an alignment direction of liquid crystal molecules on a lower side of the cholesteric liquid crystal layer formed thereon coincide with each other, and excellent polarization properties of the laminate of the cholesteric liquid crystal layers are obtained. Furthermore, this is because, interference unevenness which may occur due to uneven thickness of the adhesive layer is not observed.

The thickness of the cholesteric liquid crystal layer is preferably 0.5 to 10 μm, more preferably 1.0 to 8.0 μm, and even more preferably 1.5 to 6.0 μm.

In a case where the projection image display member 10 includes the plurality of cholesteric liquid crystal layers, the total thickness of the cholesteric liquid crystal layer is preferably 2.0 to 30 μm, more preferably 2.5 to 25 μm, and even more preferably 3.0 to 20 μm.

In the projection image display member 10, high visible light transmittance can be maintained without reducing the thickness of the cholesteric liquid crystal layer.

(Producing Method of Cholesteric Liquid Crystal Layer)

Hereinafter, manufacturing materials and a producing method of the cholesteric liquid crystal layer will be described.

As a material used for formation of the cholesteric liquid crystal layer, a liquid crystal composition including a polymerizable liquid crystal compound and a chiral agent (optically active compound) is used. The liquid crystal composition obtained by further mixing a surfactant, a polymerization initiator, or the like, and dissolving in a solvent or the like, as necessary, is applied to a support, an alignment layer, and a cholesteric liquid crystal layer to serve as an underlayer. After cholesteric alignment is matured, the alignment can be fixed by curing the liquid crystal composition to form a cholesteric liquid crystal layer.

(Polymerizable Liquid Crystal Compound)

The polymerizable liquid crystal compound may be a rod-shaped liquid crystal compound or a disk-shaped liquid crystal compound, and a rod-shaped liquid crystal compound is preferable.

As an example of the rod-shaped polymerizable liquid crystal compound for forming the cholesteric liquid crystal layer, a rod-shaped nematic liquid crystal compound is used. As the rod-shaped nematic liquid crystal compound, an azomethine compound, an azoxy compound, a cyanobiphenyl compound, a cyanophenyl ester compound, a benzoate compound, a phenylester cyclohexanecarboxylate compound, a cyanophenylcyclohexane compound, a cyano-substituted phenylpyrimidine compound, an alkoxy-substituted phenylpyrimidine compound, a phenyldioxane compound, a tolane compound, or an alkenylcyclohexylbenzonitrile compound is preferably used. Not only a low-molecular liquid crystal compound, but also a high-molecular liquid crystal compound can be used.

The polymerizable liquid crystal compound can be obtained by introducing a polymerizable group into the liquid crystal compound. The examples of a polymerizable group include an unsaturated polymerizable group, an epoxy group, an aziridinyl group, and an unsaturated polymerizable group is preferable, and an ethylenically unsaturated polymerizable group is particularly preferable. The polymerizable group can be introduced into the molecules of the liquid crystal compound using various methods. The number of polymerizable groups having the polymerizable liquid crystal compound is preferably 1 to 6 and more preferably 1 to 3 per molecule.

Examples of the polymerizable liquid crystal compound include compounds disclosed in Makromol. Chem., vol. 190, pp. 2255 (1989), Advanced Material, vol. 5, pp. 107 (1993), U.S. Pat. Nos. 4,683,327A, 5,622,648A, 5,770, 107A, WO95/022586A, WO95/024455A, WO97/000600A, WO98/023580A, WO98/052905, JP1989-272551A (JP-H01-272551A), JP1994-016616A (JP-H06-016616A), JP1995-110469A (JP-H07-110469A), JP1999-080081A (JP-H11-080081A), JP2001-328973A, and the like. Two or more kinds of the polymerizable liquid crystal compounds may be used in combination. In a case where two or more kinds of the polymerizable liquid crystal compounds are used in combination, the alignment temperature can be decreased.

The amount of polymerizable liquid crystal compound added into the liquid crystal composition is preferably 80% to 99.9% by mass, more preferably 85% to 99.5% by mass, and particularly preferably 90% to 99% by mass with respect to the mass of solid contents in the liquid crystal composition. The mass of solid contents in the liquid crystal composition is the mass excluding the mass of solvent.

In order to improve the visible light transmittance, the first selective reflection layer 12G may have low Δn. The first selective reflection layer 12G having low Δn can be formed by using a low-Δn polymerizable liquid crystal compound. Hereafter, the low-Δn polymerizable liquid crystal compound will be specifically described.

(Low-Δn Polymerizable Liquid Crystal Compound)

By forming a cholesteric liquid crystalline phase using the low-Δn polymerizable liquid crystal compound and fixing the cholesteric liquid crystalline phase to form a film, a narrow-band selective reflection layer can be obtained. Examples of the low-Δn polymerizable liquid crystal compounds include compounds described in WO2015/115390A, WO2015/147243A, WO2016/035873A, JP2015-163596A, and JP2016-053149A. Regarding the liquid crystal composition providing a selective reflection layer having a small half-width, WO2016/047648A can be referred to.

It is also preferable that the liquid crystal compound is a polymerizable compound represented by the following formula (I) described in WO2016/047648A.

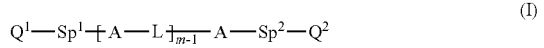

(I)

In Formula (I), A represents a phenylene group which may have a substituent or a trans-1,4-cyclohexylene group which may have a substituent, L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear or branched alkylene group having 1 to 20 carbon atoms, and a group in which one or two or more —CH$_2$— is substituted with —O—, —S—, —NH—, —N(CH$_3$)—, —C(=O)—, —OC(=O)—, or —C(=O)O— in a linear or branched alkylene group having 1 to 20 carbon atoms, and Q$^1$ and Q$^2$ each independently represent a polymerizable group selected from the group consisting of a hydrogen atom or a group represented by the following formulae Q-1 to Q-5, where, any one of Q$^1$ or Q$^2$ represents a polymerizable group.

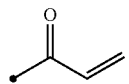

Q-1

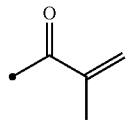

Q-2

Q-3

Q-4

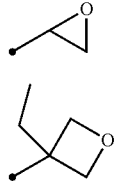

Q-5

In Formula (I), the phenylene group is preferably a 1,4-phenylene group.

Regarding the phenylene group and the trans-1,4-cyclohexylene group, the substituent in a case of "may have a substituent" is not particularly limited, and examples thereof include an alkyl group, a cycloalkyl group, an alkoxy group, an alkyl ether group, an amide group, an amino group, a halogen atom, and a substituent selected from the group consisting of a group formed by combining two or more of the above substituents. In addition, examples of the substituent include a substituent represented by —C(=O)—X$^3$-Sp$^3$-Q$^3$ described later. The phenylene group and the trans-1,4-cyclohexylene group may have 1 to 4 substituents. In a case where the phenylene group and the trans-1,4-cyclohexylene group have two or more substituents, two or more substituents may be the same as or different from each other.

The alkyl group may be linear or branched. The number of carbon atoms of the alkyl group is preferably 1 to 30, more preferably 1 to 10, and even more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a linear or branched heptyl group, an octyl group, a nonyl group, a decyl group, an undecyl group, or a dodecyl group. The above description regarding the alkyl group is also applied to an alkoxy group including an alkyl group. Specific examples of the alkylene group which is referred to as an alkylene group include a divalent group obtained by removing any one hydrogen atom from each of the above examples of the alkyl group. Examples of the halogen atom include a fluorine atom, a chlorine atom, a bromine atom, and an iodine atom.

The number of carbon atoms of the cycloalkyl group is preferably 3 to 20, more preferably 5 or more, and is preferably 10 or less, more preferably 8 or less, still more preferably 6 or less. Examples of the cycloalkyl group include a cyclopropyl group, a cyclobutyl group, a cyclopentyl group, a cyclohexyl group, a cycloheptyl group, and a cyclooctyl group.

As the substituents that the phenylene group and the trans-1,4-cyclohexylene group may have, substituents selected from the group consisting of an alkyl group and an alkoxy group, —C(=O)—X$^3$-Sp$^3$-Q$^3$ are particularly preferable. Here, X$^3$ represents a single bond, —O—, —S—, or —N(Sp$^4$-Q$^4$)-, or represents a nitrogen atom forming a ring structure together with Q$^3$ and Sp$^3$. Sp$^3$ and Sp$^4$ each independently represent a single bond or a linking group selected from the group consisting of a linear or branched alkylene group having 1 to 20 carbon atoms, and a group in which one or two or more —CH$_2$— is substituted with —O—, —S—, —NH—, —N(CH$_3$)—, —C(=O)—, —OC(=O)—, or —C(=O)O— in a linear or branched alkylene group having 1 to 20 carbon atoms.

Q$^3$ and Q$^4$ each independently represent a hydrogen atom, a cycloalkyl group, a group in which one or two or more —CH$_2$— is substituted with —O—, —S—, —NH—, —N(CH$_3$)—, —C(=O)—, —OC(=O)—, —C(=O)O— in a cycloalkyl group, or any other polymerizable group selected from the group consisting of a group represented by formulae Q-1 to Q-5.

In the cycloalkyl group, a group in which one or two or more —CH$_2$— is substituted with —O—, —S—, —NH—, —N(CH$_3$)—, —C(=O)—, —OC(=O)—, or —C(=O)O— specifically includes a tetrahydrofuranyl group, a pyrrolidinyl group, an imidazolidinyl group, a pyrazolidinyl group, a piperidyl group, a piperazinyl group, a morpholinyl group, and the like. The substitution position is not particularly limited. Among these, a tetrahydrofuranyl group is preferable, and a 2-tetrahydrofuranyl group is particularly preferable.

In the formula (I), L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—. L is preferably —C(=O)O— or —OC(=O)—. m−1 L's may be the same as or different from each other.

Sp$^1$ and Sp$^2$ each independently represent a single bond or a linking group selected from the group consisting of a linear or branched alkylene group having 1 to 20 carbon atoms, and a group in which one or two or more —CH$_2$— is substituted with —O—, —S—, —NH—, —N(CH$_3$)—, —C(=O)—, —OC(=O)—, or —C(=O)O— in a linear or branched alkylene group having 1 to 20 carbon atoms. Sp$^1$ and Sp$^2$ each preferably independently represent a linking group formed by combining one or two or more groups selected from the group consisting of a linear alkylene group having 1 to 10 carbon atoms to which a linking group selected from the group consisting of —O—, —OC(=O)—, and —C(=O)O— is bonded, —OC(=O)—, —C(=O)O—, —O—, and a linear alkylene group having 1 to 10 carbon atoms at both terminals respectively, and preferably represent a linear alkylene group having 1 to 10 carbon atoms to which —O— is bonded at both terminals, respectively.

Q$^1$ and Q$^2$ each independently represent a hydrogen atom or a polymerizable group selected from the group consisting of the groups represented by the formulae Q-1 to Q-5, where, either one of Q$^1$ or Q$^2$ represents a polymerizable group.

The polymerizable group is preferably an acryloyl group (Formula Q-1) or a methacryloyl group (Formula Q-2).

In Formula (I), m represents an integer of 3 to 12. m preferably represents an integer of 3 to 9, more preferably represents an integer of 3 to 7, and even more preferably represents an integer of 3 to 5.

The polymerizable compound represented by the formula (I) preferably includes at least one phenylene group which may have a substituent as A and at least one trans-1,4-cyclohexylene group which may have a substituent. The polymerizable compound represented by the formula (I) preferably includes 1 to 4 trans-1,4-cyclohexylene groups which may have a substituent as A, more preferably 1 to 3 trans-1,4-cyclohexylene groups, and still more preferably 2 or 3 trans-1,4-cyclohexylene groups. In addition, the polymerizable compound represented by the formula (I) preferably includes one or more phenylene groups which may have a substituent as A, more preferably 1 to 4 phenylene groups, still more preferably 1 to 3 phenylene groups, and particularly preferably 2 or 3 phenylene groups.

In Formula (I), in a case where a number obtained by dividing the number of trans-1,4-cyclohexylene groups represented by A by m is determined as mc, mc preferably satisfies 0.1<mc<0.9, more preferably satisfies 0.3<mc<0.8, and even more preferably satisfies 0.5<mc<0.7. The liquid crystal composition preferably includes a polymerizable compound represented by the formula (I) in a range of 0.5<mc<0.7, and a polymerizable compound represented by the formula (I) in a range of 0.1<mc<0.3.

Specific examples of the polymerizable compound represented by the formula (I) include compounds described in paragraphs 0051 to 0058 of WO2016/047648A, compounds described in JP2013-112631A, JP2010-070543A, JP4725516B, WO2015/115390A, WO2015/147243A, WO2016/035873A, JP2015-163596A, and JP2016-053149A, or the like.

(Chiral Agent: Optically Active Compound)

The chiral agent has a function of causing a helical structure of a cholesteric liquid crystalline phase to be induced. Since the induced sense or pitch of the helix is different depending on the compounds, the chiral compound may be selected according to the purpose.

The chiral agent is not particularly limited and known compounds can be used. Examples of chiral agents include compounds described in Liquid Crystal Device Handbooks (Chapter 3, 4-3, Chiral Agents for TN and STN, p. 199, edited by Japan Society for the Promotion of Science, 142 Committee, 1989), JP2003-287623A, JP2002-302487A, JP2002-080478A, JP2002-080851A, JP2010-181852, or JP2014-034581A.

The chiral agent normally includes asymmetric carbon atoms, but an axially asymmetric compound or a plane asymmetric compound not including asymmetric carbon atoms can also be used. Examples of the axially asymmetric compound or the plane asymmetric compound include binaphthyl, helicene, paracyclophane, and derivatives thereof.

The chiral agent may include a polymerizable group. In a case where both the chiral agent and the liquid crystal compound have a polymerizable group, a polymer that includes a repeating unit derived from the polymerizable liquid crystal compound and a repeating unit derived from the chiral agent can be formed by a polymerization reaction of a polymerizable chiral agent and the polymerizable liquid crystal compound. In this aspect, the polymerizable group of the polymerizable chiral agent is preferably the same group as the polymerizable group of the polymerizable liquid crystal compound. Accordingly, examples of a polymerizable group of the chiral agent preferably include an unsaturated polymerizable group, an epoxy group, and an aziridinyl group, an unsaturated polymerizable group is more preferable, and an ethylenically unsaturated polymerizable group is particularly preferable.

In addition, the chiral agent may be a liquid crystal compound.

As the chiral agent, an isosorbide derivative, an isomannide derivative, or a binaphthyl derivative can be preferably used. As the isosorbide derivative, a commercially available product such as LC-756 manufactured by BASF SE may be used.

A content of the chiral agent in the liquid crystal composition is preferably 0.01% to 200% by mol and more preferably 1% to 30% by mol, with respect to the amount of the polymerizable liquid crystal compound. A content of the chiral agent in the liquid crystal composition is intended to be the concentration (% by mass) of the chiral agent with respect to the total solid content in the liquid crystal composition.

(Polymerization Initiator)

The liquid crystal composition preferably includes a polymerization initiator. In an aspect of allowing a polymerization reaction with ultraviolet light irradiation, the polymerization initiator used is preferably a photopolymerization initiator capable of starting a polymerization reaction with ultraviolet light irradiation.

Examples of the photopolymerization initiator include α-carbonyl compounds (described in each specification of U.S. Pat. Nos. 2,367,661B and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of a triarylimidazole dimer and a p-aminophenylketone (described in U.S. Pat. No. 3,549,367A), acridine and phenazine compounds (described in JP1985-105667A (JP-S60-105667A), US4,239,850A), acylphosphine oxide compounds (described in JP1988-040799B (JP-S63-040799B), JP1993-029234B (JP-H5-029234B), JP1998-095788A (JP-H10-095788A), JP1998-029997A (JP-H10-029997A), JP2001-233842A, JP2000-080068A, JP2006-342166A, JP2013-114249A, JP2014-137466A, JP4223071B, JP2010-262028A, JP2014-500852), oxime compounds (described in JP2000-066385A and JP4454067B), and oxadiazole compounds (described in U.S. Pat. No. 4,212,970A), and the like. For example, the description of paragraphs 0500 to 0547 of JP2012-208494A can also be referred to.

As the polymerization initiator, it is also preferable to use the acylphosphine oxide compounds or the oxime compounds.

As the acylphosphine oxide compounds, for example, IRGACURE 810 (compound name: bis(2,4,6-trimethylbenzoyl)-phenylphosphine oxide) which is a commercially available product and manufactured by BASF Japan Ltd. can be used. As examples of the oxime compounds, IRGACURE OXE 01 (manufactured by BASF SE), IRGACURE OXE 02 (manufactured by BASF SE), TR-PBG-304 (manufactured by Changzhou Tronly Advanced Electronic Materials Co., Ltd.), Adeka Arkls NCI-930 (manufactured by ADEKA CORPORATION), Adeka Arkls NCI-831 (manufactured by ADEKA CORPORATION), and the like which are commercially available products can be used.

The polymerization initiator may be used singly or in combination of two or more kinds thereof.

A content of the photopolymerization initiator in the liquid crystal composition is preferably 0.1% to 20% by mass and more preferably 0.5% to 5% by mass, with respect to a content of the polymerizable liquid crystal compound.

(Crosslinking Agent)

In order to improve a film hardness after curing and to improve durability, the liquid crystal composition may include any crosslinking agent. The crosslinking agent which is cured with ultraviolet light, heat, or moisture can be suitably used.

The crosslinking agent is not particularly limited, and can be appropriately selected according to the purpose. Examples of the crosslinking agent include a multifunctional acrylate compound such as trimethylolpropane tri(meth)acrylate, or pentaerythritol tri(meth)acrylate; an epoxy compound such as glycidyl (meth)acrylate, or ethylene glycol diglycidyl ether; an aziridine compound such as 2,2-bishydroxymethylbutanol-tris [3-(1-aziridinyl) propionate], or 4,4-bis(ethyleneiminocarbonylamino) diphenylmethane; an isocyanate compound such as hexamethylene diisocyanate or biuret type isocyanate; a polyoxazoline compound including an oxazoline group in a side chain; and an alkoxysilane compound such as vinyltrimethoxysilane or N-(2-aminoethyl) 3-aminopropyltrimethoxysilane. In addition, a well-known catalyst can be used in accordance with reactivity of the crosslinking agent, and it is possible to improve the productivity, in addition to the improvement of the film hardness and durability. These may be used singly or in combination of two or more kinds thereof.

The content of the crosslinking agent is preferably 3% to 20% by mass and more preferably 5% to 15% by mass. By setting the content of the crosslinking agent to 3% by mass or more, the effect of improving a crosslinking density can be obtained, and by setting the content of the crosslinking agent 20% by mass or less, a reduction in the stability of the cholesteric liquid crystal layer can be prevented.

The term "(meth)acrylate" is used in the meanings of "either one of or both of acrylate and methacrylate".

(Alignment Controlling Agent)

An alignment controlling agent which contributes to stably or rapidly setting the cholesteric liquid crystal layer as a cholesteric liquid crystal layer having planar alignment, may be added into the liquid crystal composition. Examples of the alignment controlling agent include a fluorine (meth)acrylate-based polymer disclosed in paragraphs [0018] to [0043] of JP2007-272185A, a compound represented by Formulae (I) to (IV) disclosed in paragraphs [0031] to [0034] of JP2012-203237, a compound disclosed in JP2013-113913, and the like.

The alignment controlling agent may be used singly or in combination of two or more kinds thereof.

The amount of the alignment controlling agent added into the liquid crystal composition is preferably 0.01% to 10% by mass, more preferably 0.01% to 5% by mass, and particularly preferably 0.02% to 1% by mass, with respect to the total mass of the polymerizable liquid crystal compound.

(Other Additives)

In addition, the liquid crystal composition may include at least one kind selected from various additives such as a surfactant for adjusting the surface tension of a coated film and setting an even film thickness, a polymerizable monomer, and the like. Further, a polymerization inhibitor, an antioxidant, an ultraviolet absorber, a light stabilizer, a coloring material, and metal oxide fine particles may be further added into the liquid crystal composition, as necessary, in a range not deteriorating the optical performance.

Regarding the cholesteric liquid crystal layer, a cholesteric liquid crystal layer having fixed cholesteric regularity can be formed by applying a liquid crystal composition obtained by dissolving a polymerizable liquid crystal compound, a polymerization initiator, and as necessary, a chiral agent, and a surfactant in a solvent, onto a support, a phase difference layer, an alignment layer, or a cholesteric liquid crystal layer which is produced in advance, drying the liquid crystal composition to obtain a coated film, and irradiating this coated film with active light to allow polymerization of the cholesteric liquid crystal composition.

In addition, a laminated film formed of the plurality of cholesteric liquid crystal layers can be formed by repeatedly performing the manufacturing step of the cholesteric liquid crystal layer.

(Solvent)

A solvent used for preparing the liquid crystal composition is not particularly limited, and is appropriately selected according to the purpose, and an organic solvent is preferably used.

The organic solvent is not particularly limited, and is appropriately selected according to the purpose, and examples thereof include ketones, alkyl halides, amides, sulfoxides, heterocyclic compounds, hydrocarbons, esters, and ethers. These may be used singly or in combination of two or more kinds thereof. Among these, ketones are particularly preferable, in a case of considering the load on the environment.

(Coating, Alignment, Polymerization)

A coating method of the liquid crystal composition onto a support, an alignment layer, a cholesteric liquid crystal layer serving as an underlayer, and the like is not particularly limited, and can be appropriately selected in accordance with the purpose. Examples of the coating method include wire bar coating, curtain coating, extrusion coating, direct gravure coating, reverse gravure coating, die coating, spin coating, dip coating, spray coating, slide coating, and the like. In addition, the method can also be performed by transferring the liquid crystal composition which is separately applied onto a support.

Liquid crystal molecules are aligned by heating the coated liquid crystal composition. A heating temperature is preferably 200° C. or lower and more preferably 130° C. or lower. By this alignment treatment, an optical thin film in which the polymerizable liquid crystal compound is twist-aligned so as to have a helical axis in a direction substantially perpendicular to a film surface is obtained.

The aligned liquid crystal compound is further polymerized and thereby the liquid crystal composition can be cured. The polymerization may be any of thermal polymerization and photopolymerization using light irradiation, and photopolymerization is preferable. The light irradiation is preferably performed by using ultraviolet light. The irradiation energy is preferably 20 mJ/cm$^2$ to 50 J/cm$^2$ and more preferably 100 to 1,500 mJ/cm$^2$.

In order to promote a photopolymerization reaction, the light irradiation may be performed under the heating conditions or the nitrogen atmosphere. The wavelength of ultraviolet light-irradiated is preferably 350 to 430 nm. A high polymerization reaction rate is preferable, and a reaction rate is preferably 70% or more and more preferably 80% or more, from a viewpoint of stability. The polymerization reaction rate can be determined by measuring the consumption rate of polymerizable functional groups using an infrared absorption spectrum.

[Linear Polarization Reflection Layer]

The selective reflection layer may be a linear polarization reflection layer as long as the linear polarization reflection layer has the same reflectance characteristics as the above described selective reflection layer. Examples of the linear polarization reflection layer include a polarizer in which thin films having different refractive index anisotropies are laminated. Such a polarizer has a high visible light transmittance like the cholesteric liquid crystal layer and can reflect projection light that is obliquely incident at a wavelength with high luminosity factor in use of the head-up display system.

The polarizer in which thin films having different refractive index anisotropies are laminated is, for example, a polarizer described in JP1997-506837A (JP-H09-506837A). Specifically, in a case of performing processing under conditions selected in order to obtain the relationship of refractive indices, a polarizer can be formed by widely using various materials. Generally, one of first materials is required to have a refractive index different from a second material in a selected direction. The difference in refractive indices can be achieved by various methods including stretching during film formation or after film formation, extrusion molding, and coating. Furthermore, two materials preferably have similar rheological properties so that the two materials can be coextruded. Examples of rheological properties include melt viscosity.

As a polarizer obtained by laminating thin films having different refractive index anisotropies, a commercially available product can be used. The commercially available polarizer may be a laminate of a reflective polarizing plate and a temporary support. Examples of the commercially available polarizer include commercially available optical films such as DBEF (registered trademark) (manufactured by 3M) and APF (Advanced Polarizing Film (manufactured by 3M)).

It is sufficient that the thickness of the reflective polarizing plate is preferably within a range of 2.0 to 50 µm and more preferably within a range of 8.0 to 30 µm.

<Phase Difference Layer>

The projection image display member 10 includes the phase difference layer 14 as illustrated in FIG. 1. For example, the phase difference layer 14 is disposed on the back surface of the first selective reflection layer 12G.

The phase difference layer is preferably configured to give a front phase difference of λ/4 or may be configured to give a front phase difference of 3214.

By combining the phase difference layer 14 and the above described selective reflection layer 12 (cholesteric liquid crystal layer), a clear projection image can be displayed. By using the front phase difference of the phase difference layer 14 and the angle of the slow axis, the phase difference layer 14 is allowed to serve as a λ/4 phase difference layer that changes linear polarization to circular polarization. In this case, p-polarization is changed to circular polarization and thus projection light can be efficiently reflected at the selective reflection layer 12 to display a screen image.

The projection image display member produced by combining the phase difference layer 14 and the above described selective reflection layer 12 has higher brightness and can also suppress formation of double images. Even in the windshield glass and the head-up display system including the projection image display member, higher brightness can be obtained and formation of double images can be suppressed.

The front phase difference of the phase difference layer 14 may have the ¼ length of the visible light wavelength range, or the ½ length of the visible light wavelength range. Particularly, the front phase difference of the phase difference layer 14 may have the ¼ length or the ½ length of the selective reflection center wavelength of the selective reflection layer 12 or the center wavelength of an emission wavelength of the projector (imager) of the head-up display system. In a case where the selective reflection layer 12 includes a plurality of cholesteric liquid crystal layers, the front phase difference of the phase difference layer 14 may have any one of the ¼ length, the ½ length, or the like of the selective reflection center wavelength of cholesteric liquid crystal layer.

In the phase difference layer 14, for example, the front phase difference at a wavelength of 550 nm is preferably in a range of 100 to 450 nm, and more preferably in a range of 120 to 200 nm or 300 to 400 nm.

The phase difference layer 14 is not particularly limited, and can be appropriately selected according to the purpose. Examples of the phase difference layer 14 include a stretched polycarbonate film, a stretched norbornene-based polymer film, a transparent film in which inorganic particles having birefringence such as strontium carbonate are included and aligned, a thin film in which oblique deposition of an inorganic dielectric is performed on a support, a film in which the polymerizable liquid crystal compound is uniaxially aligned and the alignment is fixed, a film in which the liquid crystal compound is uniaxially aligned and the alignment is fixed, and the like.

Among these, the phase difference layer 14 is suitably a film obtained by uniaxially aligning and fixing a polymerizable liquid crystal compound.

As an example, the phase difference layer 14 can be formed following order. A liquid crystal composition including a polymerizable liquid crystal compound is applied on a temporary support or the surface of the alignment layer, the polymerizable liquid crystal compound in the liquid crystal composition is formed in a nematic alignment in a liquid crystal state, and then the polymerizable liquid crystal compound is fixed by curing to form the phase difference layer 14.

In this case, the formation of the phase difference layer 14 can be carried out in the same manner as the formation of the cholesteric liquid crystal layer, except that no chiral agent is added to the liquid crystal composition. However, during the formation of the nematic alignment after applying the liquid crystal composition, the heating temperature is preferably to 120° C., and more preferably 60° C. to 100° C.

The phase difference layer 14 may be a layer formed by applying a composition including a high-molecular liquid crystal compound on the temporary support, the surface of the alignment layer or the like, forming the nematic alignment in a liquid crystal state, cooling the composition, and then obtained by fixing the alignment.

The thickness of the phase difference layer 14 is not limited, but is preferably 0.2 to 300 μm, more preferably 0.5 to 150 and even more preferably 1.0 to 80 μm. The thickness of the phase difference layer 14 formed of the liquid crystal composition is not particularly limited, and is preferably 0.2 to 10 μm, more preferably 0.5 to 5.0 μm, and even more preferably 0.7 to 2.0 μm.

Figure 2:
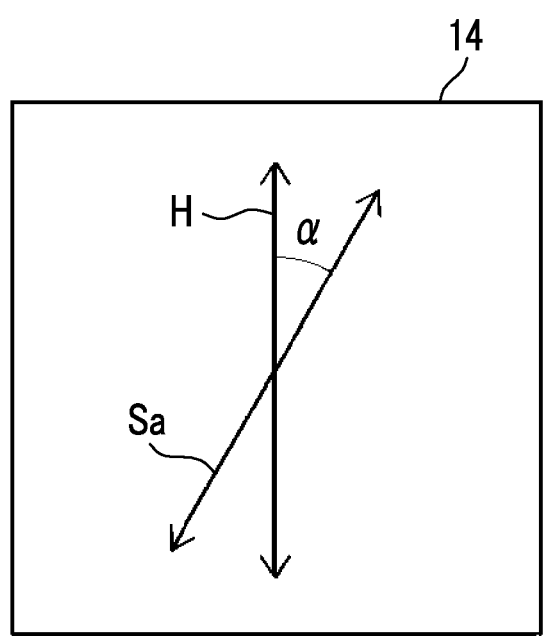
FIG. 2 is a schematic diagram for explaining a slow axis.

As illustrated in FIG. 2, in the phase difference layer 14, for example, a slow axis Sa inclined at an angle α is set with respect to an axis H of the phase difference layer 14 in any direction. The direction of the slow axis Sa can be set by, for example, rubbing treatment on an alignment film serving as the underlayer of the phase difference layer 14.

In a case where the projection image display member 10 is used for a head-up display system 20 (refer to FIG. 3), the direction of the slow axis Sa of the phase difference layer 14 is preferably determined in accordance with the incident direction of projection light for displaying projection images and the helical sense of the cholesteric liquid crystal layer constituting the selective reflection layer 12.

In the following description, the head-up display system (head-up display) is also referred to as "HUD". In addition, "HUD" is an abbreviation for "Head up Display".

As an example, in the HUD 20, the direction of the slow axis Sa of the phase difference layer 14 is set so that the axis H illustrated in FIG. 2 matches the up and down direction Y in use. The up and down direction Y in use is, for example, a direction corresponding to the vertical direction (top-bottom direction) in a vehicle outer surface of a windshield glass included in the HUD 20 (see FIG. 3).

For example, in a case where the direction of the projection image display member 10 in use of the HUD 20 is determined and projection light is incident from the lower side of the projection image display member 10 (windshield glass) and the selective reflection layer 12 (cholesteric liquid crystal layer) from the phase difference layer 14 side, the direction of the slow axis Sa can be determined in the following range in accordance with the front phase difference.

For example, in a case where the phase difference layer 14 having a front phase difference of 50 to 180 nm is used, an angle α defined by the slow axis Sa of the phase difference layer 14 with respect to the up and down direction Y (axis H) of the projection image display member 10 is preferably in a range of +120° to +175° or −120° to −175°.

The phase difference layer 14 preferably has the following configuration.

In a case where the phase difference layer 14 having a front phase difference of 250 to 450 nm is used, an angle α defined by the slow axis Sa of the phase difference layer 14 with respect to the up and down direction Y of the projection image display member 10 is preferably in a range of +35° to +70° or −35° to −70°.

In a case where the phase difference layer 14 having a front phase difference of 50 to 180 nm is used, an angle α defined by the slow axis Sa of the phase difference layer 14 with respect to the up and down direction Y of the projection image display member 10 is preferably in a range of +125° to +160° or −125° to −160°.

As for the slow axis Sa of the phase difference layer 14, the angles α are defined by + and − with respect to the axis H (up and down direction Y) as described above. These + and − means the clockwise direction (+) and the counter-clockwise direction (−) in a case where the visible position is fixed.

The preferred direction depends on the helical sense of the cholesteric liquid crystal layer constituting the selective reflection layer 12 of the projection image display member 10. For example, in a case where helical senses of all of the cholesteric liquid crystal layers included in the projection image display member are right-handed, the direction of the slow axis may be 30° to 85° or 120° to 175° in the clockwise direction as viewed from the phase difference layer side with respect to the cholesteric liquid crystal layer. In a case where helical senses of all of the cholesteric liquid crystal layers included in the projection image display member are left-handed, the direction of the slow axis may be 30° to 85° or 120° to 175° in the counterclockwise direction as viewed from the phase difference layer side with respect to the cholesteric liquid crystal layer.

As will be described later, in the HUD 20 using the projection image display member according to the embodiment of the present invention, a projector 22 emits the projection light of p-polarization, and the projection image display member 10 reflects the p-polarization to display a screen image.

Specifically, in the projection image display member 10, the phase difference layer 14 first converts the projection light of the incident p-polarization into circular polarization. Next, the selective reflection layer 12 (cholesteric liquid crystal layer) selectively reflects the circular polarization, and the reflected circular polarization is incident in the phase difference layer 14 again. Furthermore, the phase difference layer 14 converts the circular polarization into p-polarization. Thereby, the projection image display member 10 reflects the projection light of the incident p-polarization as it is.

Therefore, the direction of the slow axis Sa of the phase difference layer 14 is set to convert the incident p-polarization into circular polarization in a turning direction, which is reflected by the selective reflection layer 12, according to the sense of the circular polarization that is selectively reflected by the selective reflection layer 12 (cholesteric liquid crystal layer). That is, in a case where the selective reflection layer 12 selectively reflects the right circular polarization, the direction of the slow axis Sa of the phase difference layer 14 is set to make the incident p-polarization right circular polarization. On the other hand, in a case where the selective reflection layer 12 selectively reflects the left circular polarization, the direction of the slow axis Sa of the phase difference layer 14 is set in an inverse direction to make the incident p-polarization left circular polarization.

<Polarization Conversion Layer>

In the HUD, the projection image display member 10 according to the embodiment of the present invention is provided with the phase difference layer 14, the selective reflection layer 12, and the polarization conversion layer 11 in this order from the visible side, that is, a side on which the projection light is incident.

The polarization conversion layer 11 is a layer in which a helical structure (helical alignment structure) of the liquid crystal compound is fixed, and the number of pitches x of the helical structure and a film thickness y [μm] of the polarization conversion layer satisfy all of Relational Expressions (i) to (iv) as follows.

$$0.3 \leq x \leq 7.0 \quad \text{(i)}$$

$$0.5 \leq y \leq 6.0 \quad \text{(ii)}$$

$$y \leq 0.7x + 3.2 \quad \text{(iii)}$$

$$y \geq 0.7x - 1.4 \quad \text{(iv)}$$

In addition, one pitch of the helical structure of the liquid crystal compound is one helical turn of the liquid crystal compound, similar to the above described cholesteric liquid crystal layer (selective reflection layer 12). That is, the number of pitches of 1 is defined as a state in which the director (in the long axis direction in the case of a rod-shaped liquid crystal) of the helically aligned liquid crystal compound is rotated by 360°.

Since the projection image display member 10 includes the polarization conversion layer 11 in addition to the phase difference layer 14 and the selective reflection layer 12, the suitability of the HUD for polarized sunglasses is improved. Furthermore, a double image is suppressed, and particularly, it is possible to efficiently suppress a double image in a case where a projection image is formed by emitting p-polarization.

The reason why the suitability for polarized sunglasses can be improved by providing the polarization conversion layer 11 is that the polarization conversion layer 11 has a helical structure like a cholesteric liquid crystalline phase and exhibits optical turning properties and birefringence with respect to visible light having a wavelength shorter than a reflection peak wavelength in the infrared region, and thus polarization in the visible region can be controlled. In particular, in the s-polarization incident from the outside of the windshield glass, polarization thereof significantly changes in the phase difference layer 14. Therefore, by controlling the number of pitches and the film thickness of the polarization conversion layer 11 so that the polarization conversion layer 11 can optically compensate, the suitability for polarized sunglasses can be improved.

The reason why the formation of double images can be further suppressed by providing the polarization conversion layer 11 is presumed that light having a wavelength not in the selective reflection region of the selective reflection layer 12 (cholesteric liquid crystal layer) converts polarization thereof in the selective reflection layer 12 and is reflected on the back surface of the windshield glass, and as a result, the generation of double images can be further suppressed based on the reflection.

The details will be described below.

As will be described later, in the HUD of the present invention using the projection image display member 10 according to the embodiment of the present invention (the windshield glass of the present invention), p-polarization as projection light is incident on the windshield glass, and the projection image display member 10 incorporated into the windshield glass reflects the p-polarization to display a projection image. Specifically, in the projection image display member 10, the phase difference layer 14 converts the p-polarization into circular polarization in a predetermined turning direction, the selective reflection layer 12 reflects the circular polarization, and the phase difference layer 14 converts the circular polarization into p-polarization again, thereby reflecting the incident p-polarization.

In a case where p-polarization is incident obliquely on the glass, the reflection by the glass is very small. The HUD of the present invention can eliminate double images due to light reflected by the inner surface and the outer surface of the windshield glass by projecting p-polarization and reflecting the p-polarization by the projection image display member 10. Therefore, it is not necessary to make the windshield glass wedge-shaped. The inner surface of the windshield glass is a vehicle inner surface of a vehicle or the like, and is usually an incidence surface of projection light emitted from the HUD. On the other hand, the outer surface of the windshield glass is a vehicle outer surface of a vehicle or the like, and is usually a surface opposite to an incidence surface of projection light emitted from the HUD.

In addition, since the projection image display member 10 of this type can reflect the incident p-polarization with a high reflectance without waste of light, the brightness of the projection image generated by the HUD can also be improved.

On the other hand, most of the so-called glare components that enter from the outside of the windshield glass in a vehicle or the like, such as light reflected by a puddle, light reflected by a windshield glass of an oncoming vehicle, and light reflected by a bonnet, are s-polarization. Therefore, polarized sunglasses are designed to shield the s-polarization component.

Therefore, in the HUD that projects the projection light of normal s-polarization, in a case where a user wears polarized sunglasses, the projection image cannot be observed.

On the other hand, in the HUD using the projection image display member 10 according to the embodiment of the present invention, since the projection image is generated by projecting p-polarization, so that the projection image obtained from the HUD can be observed properly unlike the HUD that projects normal s-polarization, even though a driver uses polarized sunglasses.

Herein, in a case where polarization having a non-reflective component is incident on and transmitted to a reflection layer that selectively reflects predetermined circular polarization, such as a reflection layer using a cholesteric layer, a polarization state is changed.

As described above, the glare component that enters from the outside of the windshield glass is s-polarization. Therefore, the s-polarization transmitted through the reflection layer that selectively reflects the circular polarization corresponding to the p-polarization is ideally circular polarization in the turning direction corresponding to the s-polarization. This circular polarization is then converted into s-polarization again by the phase difference layer. Therefore, s-polarization that is the glare component entering from the outside of the windshield glass can be shielded by using the polarized sunglasses.

However, the s-polarization incident on the windshield glass from the outside is incident on the windshield glass at various angles as well as the component incident on the reflection layer (reflection film, half-mirror) of the windshield glass from the normal direction. Therefore, in the HUD in the related art as described in WO2016/056617A and JP2017-187685A, in which p-polarization is projected due to a phase difference layer and a circular polarization reflection layer, s-polarization that enters from the outside and is transmitted through the reflection layer becomes elliptical polarization instead of circular polarization.

In a case where such elliptical polarization is transmitted through the phase difference layer, not only the s-polarization but also p-polarization components are mixed in the transmitted light. Since the p-polarization cannot be shielded by the polarized sunglasses, the p-polarization is transmitted through the polarized sunglasses.

Therefore, in the HUD projecting p-polarization in the related art, there is a problem that the function of the polarized sunglasses to cut the glare of the reflected light that is mainly composed of s-polarization is impaired, which hinders driving. That is, the HUD in the related art as described in WO2016/056617A and JP2017-187685A, which projects p-polarization and is provided with a half-mirror film using a phase difference layer and a circular polarization reflection layer, have low suitability for polarized sunglasses.

On the other hand, the projection image display member according to the embodiment of the present invention includes the polarization conversion layer 11 on a surface of the selective reflection layer 12 opposite to the phase difference layer 14. That is, the reflected light that is incident from the outside of the windshield glass and whose main component is s-polarization to be glare is firstly transmitted through the polarization conversion layer 11.

The polarization conversion layer 11 is a layer in which the helical structure of the liquid crystal compound is fixed, and the number of pitches x of the helical structure and the film thickness y [μm] of the polarization conversion layer satisfy the above described Relational Expressions (i) to (iv).

The polarization conversion layer 11 exhibits optical turning properties and birefringence with respect to visible light since the liquid crystal compound has the helical structure satisfying Relational Expressions (i) to (iv). Particularly, by setting the pitch P of the helical structure of the polarization conversion layer 11 to have a length corresponding to the pitch P of the cholesteric liquid crystal layer in which the selective reflection center wavelength is within the long wavelength infrared region, it is possible to exhibit high optical turning properties and birefringence with respect to visible light having a short wavelength.

As described above, the pitch P of the helical structure is the length of one helical pitch, and is a length in the helical axial direction in which the director of the liquid crystal compound is rotated by 360°. The helical axial direction is usually a thickness direction of the polarization conversion layer.

As described above, the reflected light incident from the outside to be glare is mainly s-polarization. Therefore, the s-polarization incident on the polarization conversion layer 11 is converted into elliptical polarization in a turning direction according to the s-polarization due to the optical turning properties and birefringence included in the polarization conversion layer 11. The elliptical polarization is transmitted through the polarization conversion layer 11 and is then incident on the selective reflection layer 12. Since the elliptical polarization converted from the s-polarization is not a reflection component that does not have the turning direction caused by the selective reflection layer 12, the elliptical polarization is transmitted through the selective reflection layer 12 and converted into circular polarization having the turning direction corresponding to the s-polarization. Next, this circular polarization is transmitted through the phase difference layer 14 to be converted into s-polarization, and then transmitted through the windshield glass.

That is, according to the projection image display member 10 of the embodiment of the present invention including the polarization conversion layer 11, since the s-polarization that enters from the outside of the windshield glass to be glare is transmitted as s-polarization, the s-polarization can be shielded by the polarized sunglasses. Therefore, according to the present invention, it is possible to improve the suitability for polarized sunglasses in the HUD that projects p-polarization.

In addition, there is a case where a component of s-polarization that is not p-polarization may be mixed in the projection light. This component is transmitted through the selective reflection layer 12 and is reflected by the outer surface (back surface) of the windshield glass, which causes a double image.

On the other hand, according to the projection image display member 10 of the embodiment of the present invention including the polarization conversion layer 11, the component of the s-polarization that has been transmitted through the selective reflection layer 12 is converted into the component of the p-polarization through the polarization conversion layer 11 having optical turning properties and birefringence.

As described above, p-polarization has a very low reflectance in a case where the p-polarization is obliquely incident on the glass. Therefore, according to the projection image display member 10 of the embodiment of the present invention including the polarization conversion layer 11, the reflection of the s-polarization that is transmitted through the selective reflection layer 12 and reflected by the outer surface of the windshield glass can be suppressed even though the component of the s-polarization is mixed in the projection light. Therefore, according to the projection image display member 10 of the embodiment of the present invention including the polarization conversion layer 11, double images caused by light transmitted through the selective reflection layer 12 and reflected by the outer surface (back surface) of the windshield glass can be reduced.

As described above, in the projection image display member 10 of the embodiment of the present invention, the number of pitches x of the helical structure and the film thickness y of the polarization conversion layer in the polarization conversion layer 11 satisfy all of Relational Expressions (i) to (iv).

Relational Expression (i) is "0.3≤x≤7.0".

In a case where the number of pitches x of the helical structure is less than 0.3, disadvantages such as insufficient turning characteristics and birefringence occur.

In addition, in a case where the number of pitches x of the helical structure is more than 7.0, disadvantages that turning characteristics and birefringence are excessive, and desired elliptical polarization cannot be obtained occur.

Relational Expression (ii) is "0.5≤y≤6.0".

In a case where the thickness y of the polarization conversion layer 11 is less than 0.5 μm, the film thickness is too thin, disadvantages such as insufficient turning characteristics and birefringence occur.

In a case where the thickness y of the polarization conversion layer 11 is more than 6.0 μm, disadvantages that turning characteristics and birefringence are excessive, desired elliptical polarization cannot be obtained, and poor alignment is likely to occur, which is not preferable for manufacturing, occur.

Relational Expression (iii) is "y≤0.7x+3.2".

In a case where the thickness y [μm] of the polarization conversion layer 11 is more than 0.7x+3.2, disadvantages that birefringence are excessive, and poor balance with turning characteristics occur.

Furthermore, Relational Expression (iv) is "y≥0.7x−1.4".

In a case where the thickness y [μm] of the polarization conversion layer 11 is less than 0.7x−1.4, the polarization conversion layer is formed in the visible light region, so that disadvantages that sufficient turning characteristics cannot be obtained, other optical properties such as a reflectance, tint, or the like are affected occur.

In the projection image display member 10 according to the embodiment of the present invention, the number of pitches x of the polarization conversion layer 11 is preferably 0.4 to 3.0, and the film thickness y is preferably 0.8 to 4.0 μm.

Particularly, the polarization conversion layer 11 preferably satisfies all of Relational Expressions (v) to (vii) in addition to Relational Expressions (i) to (iv) as follows.

$$0.3 \leq x \leq 1.2 \quad \text{(v)}$$

$$1.0 \leq y \leq 3.0 \quad \text{(vi)}$$

$$y \geq 1.875x \quad \text{(vii)}$$

That is, it is preferable that the polarization conversion layer 11 has a long pitch P of the helical structure and a small number of pitches x.

Specifically, in the polarization conversion layer 11, it is preferable that the helical pitch P is equal to a pitch P of the cholesteric liquid crystal layer in which the selective reflection center wavelength is within the long wavelength infrared region, and the number of pitches x is small. More specifically, in the polarization conversion layer 11, it is preferable that the helical pitch P is equal to a pitch P of the cholesteric liquid crystal layer in which the selective reflection center wavelength is within 3000 to 8000 nm, and the number of pitches x is small.

Since the selective reflection center wavelength corresponding to the pitch P in the polarization conversion layer 11 is much longer than that of visible light, the above described optical turning properties and birefringence with respect to visible light are more suitably exhibited.

Therefore, since the polarization conversion layer 11 satisfies all of Relational Expressions (v) to (vii), the suitability for polarized sunglasses of the HUD using the projection image display member 10 of according to the embodiment of the present invention and the effect of suppressing the double image can be further improved.

As will be illustrated later in Examples, the polarization conversion layer 11 can be basically formed in the same manner as the above described cholesteric liquid crystal layer.

However, in a case of forming the polarization conversion layer 11, it is necessary to adjust the liquid crystal compound to be used, the chiral agent to be used, the amount of the chiral agent added, the film thickness, and the like so that the number of pitches x and the film thickness y [μm] of the helical structure in the polarization conversion layer 11 satisfy all of Relational Expressions (i) to (iv), and more preferably satisfy all of Relational Expressions (v) to (vii).

<Other Layers>

The projection image display member 10 according to the embodiment of the present invention may include, as necessary, other layers in addition to the selective reflection layer 12, the phase difference layer 14, and the polarization conversion layer 11 described above.

All of the other layers are preferably transparent in the visible light region.

In addition, all of the other layers preferably have a low birefringence. The term "low birefringence" means that a front phase difference in a wavelength range where the projection image display member 10 in the windshield glass according to the embodiment of the present invention exhibits the reflection is 10 nm or less. This front phase difference is preferably 5 nm or less. Furthermore, all of the other layers preferably have a small difference between a refractive index and an average refractive index (in-plane average refractive index) of the cholesteric liquid crystal layers constituting the selective reflection layer 12.

Examples of the other layers include the support 15, the alignment layer, and the adhesive layer.

(Support)

The projection image display member 10 illustrated in FIG. 1 includes the support 15. In the projection image display member 10, the support 15 supports the phase difference layer 14, the selective reflection layer 12, and the polarization conversion layer 11.

The support 15 can be used as a substrate in a case of forming the phase difference layer, or can also be used as a substrate in a case of forming the selective reflection layer 12 (cholesteric liquid crystal layer) together with the phase difference layer.

The support 15 used to form the selective reflection layer 12 or the phase difference layer 14 may be the temporary support that is peeled off after the formation of the selective reflection layer 12. Therefore, the support 15 may not be included in the completed projection image display member and the windshield glass.

In a case where the completed projection image display member or the windshield glass includes the support 15 instead of peeling off as the temporary support, the support 15 is preferably transparent in the visible light region. In a case where the support 15 is used as the substrate used to form the phase difference layer 14, it is preferable that the support 15 has low birefringence.

Materials for forming the support 15 are not limited. Examples of the support 15 include plastic films of polyester such as polyethylene terephthalate (PET), polycarbonate, an acrylic resin, an epoxy resin, polyurethane, polyamide, polyolefin, cellulose derivative, and silicone. As the temporary support, glass may be used in addition to the plastic films.

A thickness of the support may be approximately 5.0 to 1000 μm, is preferably 10 to 250 μm, and more preferably 15 to 90 μm.

(Alignment Layer)

The projection image display member 10 may include an alignment layer, in which the liquid crystal compound is aligned, as an underlayer to which the liquid crystal composition is applied in a case of forming the selective reflection layer 12 (cholesteric liquid crystal layer) and/or the phase difference layer 14.

The alignment layer may be provided by methods such as a rubbing treatment of an organic compound (resin such as polyimide, polyvinyl alcohol, polyester, polyallylate, polyamideimide, polyetherimide, polyamide, and modified polyamide) such as a polymer, oblique vapor deposition of an inorganic compound, formation of a layer having a microgroove, or accumulation of an organic compound (for example, ω-tricosanoic acid, dioctadecyl methyl ammonium chloride, and methyl stearate) by using a Langmuir-Blodgett technique (LB film). Furthermore, a layer that has alignment function generated by applying an electric field, applying a magnetic field, irradiation with light, or the like may be used as the alignment layer.

For example, the alignment layer formed of a polymer is preferably subjected to the rubbing treatment, and the liquid crystal composition is preferably applied onto the rubbed surface. The rubbing treatment can be performed by rubbing a surface of a polymer layer in a constant direction with paper or cloth several times.

The liquid crystal composition may be applied to the surface of the support or the surface of the support which is subjected to the rubbing treatment, without providing the alignment layer.

In a case of forming a liquid crystal layer by using the temporary support, the alignment layer is peeled off with the temporary support, so that the alignment layer may not be a layer constituting the projection image display member.

The thickness of the alignment layer is preferably 0.01 to 5.0 μm, and more preferably 0.05 to 2.0 μm.

(Adhesive Layer)

The projection image display member 10 may include an adhesive layer, as necessary, in order to improve an adhesion between layers.

In a case where the adhesive layer is provided in the projection image display member 10 of the illustrated example, the adhesive layer is provided at one or more between the first selective reflection layer 12G and the second selective reflection layer 12R, between the selective reflection layer 12 and the phase difference layer 14, between the selective reflection layer 12 and the polarization conversion layer 11, or between the support 15 and the phase difference layer 14.

The adhesive layer may be formed using an adhesive.

From a viewpoint of a curing method, the adhesive includes a hot melt type adhesive, a thermosetting adhesive, a photocuring adhesive, a reaction curing type adhesive, and pressure-sensitive type adhesive which does not need curing. As materials, acrylate-based, urethane-based, urethane acrylate-based, epoxy-based, epoxy acrylate-based, polyolefin-based, modified olefin-based, polypropylene-based, ethylene vinyl alcohol-based, vinyl chloride-based, chloroprene rubber-based, cyanoacrylate-based, polyamide-based, polyimide-based, polystyrene-based, polyvinylbutyral-based compounds can be used. From viewpoints of workability and productivity, a photocuring method is preferable as a curing method, and from viewpoints of optical transparency and heat resistance, the acrylate-based, urethane acrylate-based, and epoxy acrylate-based compounds are preferably used as the material.

The adhesive layer may be formed using a pressure sensitive adhesive such as a highly transparent adhesive transfer tape (optically clear adhesive (OCA) tape). A commercially available product for an image display device, in particular, a commercially available product for the surface of the image display portion of an image display device may be used as the highly transparent adhesive transfer tape. Examples of commercially available products include pressure sensitive adhesive sheets (such as PD-S1) manufactured by Panac Co., Ltd., and pressure sensitive adhesive sheets of MHM series manufactured by NICHIEI KAKOH CO., LTD.

The thickness of the adhesive layer is not limited. The thickness of the adhesive layer formed of an adhesive is preferably 0.5 to 10 μm, and more preferably 1.0 to 5.0 μm. The thickness of the adhesive layer formed using the highly transparent adhesive transfer tape (pressure sensitive adhesive) is preferably 10 to 50 μm, and more preferably 15 to 30 μm. The adhesive layer is preferably provided to have an even film thickness, in order to reduce the color unevenness and the like of the projection image display member.

(Hardcoat Layer)

As necessary, the projection image display member according to the embodiment of the present invention may include a hardcoat layer on the support and/or the polarization conversion layer in order to improve scratch resistance.

[Composition for Forming Hardcoat Layer]

The hardcoat layer is preferably formed using a composition for forming a hardcoat layer.

The composition for forming a hardcoat layer preferably contains a compound having three or more ethylenically unsaturated double bond groups in a molecule.

Examples of the ethylenically unsaturated double bond group include polymerizable functional groups such as a (meth)acryloyl group, a vinyl group, a styryl group, and an allyl group. Among these, a (meth)acryloyl group and —C(O)OCH=CH$_2$ are preferable, and a (meth)acryloyl group is particularly preferable. By having the ethylenically unsaturated double bond group, high hardness can be maintained and moisture heat resistance can be imparted. Furthermore, higher hardness can be exhibited by having three or more ethylenically unsaturated double bond groups in the molecule.

Examples of the compound containing three or more ethylenically unsaturated double bond groups in the molecule include esters of a polyhydric alcohol and a (meth)acrylic acid, vinylbenzene and derivatives thereof, vinylsulfone, (meth)acrylamides, and the like. Among these, compounds having three or more (meth)acryloyl groups are preferred from the viewpoint of hardness, and examples thereof include acrylate-based compounds forming high-hardness cured substances that are broadly used in the present industrial field. Examples of the above described compounds include esters of a polyhydric alcohol and a (meth)acrylic acid. Examples of esters of a polyhydric alcohol and a (meth)acrylic acid include pentaerythritol tetra(meth)acrylates, pentaerythritol tri(meth)acrylates, trimethylolpropane tri(meth)acrylates, EO-modified trimethylolpropane tri(meth)acrylates, PO-modified trimethylolpropane (meth)acrylates, EO-modified tri(meth)acrylate phosphates, trimethylolethane tri(meth)acrylates, ditrimethylolpropane tetra(meth)acrylates, dipentaerythritol tetra(meth)acrylates, dipentaerythritol penta(meth)acrylates, dipentaerythritol hexa(meth)acrylates, pentaerythritol hexa(meth)acrylates, 1,2,3-cyclohexane tetramethacrylate, polyurethanepolyacrylate, polyester polyacrylate, caprolactone-modified tris(acryloxyethyl) isocyanurate, and the like.

Examples of specific compounds of polyfunctional acrylate-based compounds having three or more (meth)acryloyl groups include esterified substances of a polyol such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, KAYARAD GPO-303 manufactured by Nippon Kayaku Co., Ltd., V #400, or V #36095D manufactured by Osaka Organic Chemical Industry Ltd. and a (meth)acrylic acid. In addition, it is also possible to suitably use tri- or higher-functional urethane acrylate compounds of SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, SHIKOH UV-2750B (manufactured by Nippon Synthetic Chemical Industry Co., Ltd.), UL-503LN (manufactured by Kyoeisha Chemical Co., Ltd.), UNIDIC 17-806, UNIDIC 17-813, UNIDIC V-4030, UNIDIC V-4000BA (manufactured by Dainippon Printing Ink Manufacturing), EB-1290K, EB-220, EB-5129, EB-1830, EB-4358 (manufactured by Daicel-UCB Company, Ltd.), HIGH-COAP AU-2010, HIGH-COAP AU-2020 (manufactured by Tokushiki Co., Ltd.), ARONIX M-1960 (manufactured by Toagosci Co., Ltd.), ART RESIN UN-332011A, UN-3320HC, UN-3320HS, UN-904, and HDP-4T, tri- or higher-functional polyester compounds of ARONIX M-8100, M-8030, M-9050 (manufactured by Toagosei Co., Ltd.), and KBM-8307 (manufactured by Daicel Cytec Co., Ltd.), and the like.

In addition, the compound containing three or more ethylenically unsaturated double bond groups in the molecule may be constituted of a single compound, or a combination of a plurality of compounds can also be used.

[Method of Forming Hardcoat Layer]

The hardcoat layer can be formed by applying the above described composition for forming a hardcoat layer on the support and/or the polarization conversion layer, drying and curing the applied composition.

<Coating Method of Hardcoat Layer>

The hardcoat layer can be formed by the following coating method, but the method is not limited thereto. Well-known methods such as a dip coating method, an air knife coating method, a curtain coating method, a roller coating method, a wire bar coating method, a gravure coating method, a slide coating method, an extrusion coating method (a die coating method) (refer to JP2003-164788A), and a micro gravure coating method can be used, and, among these, a micro gravure coating method and a die coating method are preferred.

<Drying and Curing Conditions for Hardcoat Layer>

Regarding drying and curing methods in a case where layers such as the hardcoat layer in the present invention are formed by means of coating, preferred examples will be described below.

In the present invention, it is effective to cure the compound by combining irradiation of ionizing radiation and a heat treatment carried out before the irradiation, at the same time as the irradiation, or after the irradiation.

Hereinafter, several patterns of manufacturing steps will be described, but the pattern is not limited thereto ("-" in the following example indicates that no heat treatments are carried out.) Before irradiation→at the same time as irradiation→after irradiation (1) Heat treatment→ionizing radiation curing→-
(2) Heat treatment→ionizing radiation curing→heat treatment
(3) -→ionizing radiation curing→heat treatment Additionally, a step in which a heat treatment is carried out at the same time as ionizing radiation curing is also preferred.

In the present invention, in the case of forming the hardcoat layer, as described above, it is preferable to carry out a heat treatment in combination with irradiation of ionizing radiation. The heat treatment is not particularly limited as long as constituent layers including the support and the hardcoat layer in a hardcoat film are not impaired, but is preferably 25° C. to 150° C., and more preferably 30° C. to 80° C.

The time taken for the heat treatment varies depending on the molecular weights of components being used, interactions with other components, viscosity, and the like, but is preferably 15 seconds to one hour, more preferably 20 seconds to 30 minutes, and even more preferably 30 seconds to 5 minutes.

The type of the ionizing radiation is not particularly limited, and examples thereof include X-rays, electron beams, ultraviolet light, visible light, infrared light, and the like, and ultraviolet light is broadly used.

For example, in a case where coated films are ultraviolet-curable, individual layers are preferably cured by irradiation with ultraviolet light at an irradiation level of 10 to 1,000 $mJ/cm^2$ using an ultraviolet lamp. During the irradiation, the coated films may be irradiated with ultraviolet light having the above described energy once or can also be separately irradiated. Particularly, from the viewpoints that performance variation in the plane of the coated film is alleviated, and curling is improved, it is preferable that the coated films are irradiated with ultraviolet light two or more separate times, and it is preferable that the coated films are irradiated with ultraviolet light at a low irradiance level of 150 $mJ/cm^2$ or less in the initial stage, and then irradiated with ultraviolet light at a high irradiance level of 50 $mJ/cm^2$ or more and irradiated with ultraviolet light at a higher irradiance level in the latter stage than in the initial stage.

Hereinafter, the windshield glass including the projection image display member according to the embodiment of the present invention and the HUD will be described.

<Windshield Glass>

The windshield glass having a projection image display function can be provided using the projection image display member according to the embodiment of the present invention.

The term "windshield glass" means windows and windshields for vehicles such as cars and trains, airplanes, ships, motorcycles, and general vehicles such as playground equipment. The windshield glass is preferably used as a front glass, a windshield, or the like in a forward vehicle in a traveling direction.

There is no limit to the visible light transmittance of the windshield glass, but a higher value is preferable. A visible light transmittance of the windshield glass is preferably 70% or more, more preferably more than 70%, even more preferably 75% or more, and particularly preferably 80% or more.

The above described visible light transmittance is preferably satisfied at any position of the windshield glass, and particularly, it is preferable that the above described visible light transmittance is satisfied at a position where the projection image display member is present. As described above, since the projection image display member of the present invention has high visible light transmittance in a wavelength range with high luminosity factor, the configuration in which the above described visible light transmittance is satisfied even though glass generally used for windshield glass is used can be achieved.

The shape of the windshield glass is not limited, and is appropriately determined according to a target on which the windshield glass is disposed. The windshield glass may be, for example, a flat surface or a three-dimensional shape having a curved surface such as a concave surface or a convex surface. In the windshield glass molded for an applicable vehicle, the upward direction during normal use, and surfaces becoming the observer side, the driver side, and the visible side such as the inside of the vehicle can be specified.

The thickness of the windshield glass may be uniform or non-uniform in the projection image display member. For example, the windshield glass may have a wedge-shaped cross section and the thickness of the projection image display member may be non-uniform as the glass for vehicles described in JP2011-505330A, but the thickness of the projection image display member is preferable to be uniform.

[Projection Image Display Member]

The projection image display member of the present invention may be provided at a projection image display portion (projection image reflection portion) of the windshield glass.

By providing the projection image display member according to the embodiment of the present invention on an outer surface of a glass plate of the windshield glass, or by providing the projection image display member between sheets of glass of the windshield glass having a laminated glass configuration as described later, the HUD in which the windshield glass is used can be configured.

In a case where the projection image display member according to the embodiment of the present invention is provided on the outer surface of the glass plate of the windshield glass, the projection image display member may be provided on the inside (a side on which the projection image is incident) of a vehicle or the like or may be provided on the outside, but is preferably provided on the inside.

The projection image display member according to the embodiment of the present invention has lower scratch resistance than the glass plate. Therefore, in a case where the windshield glass has a laminated glass structure, in order to protect the projection image display member, the projection image display member is more preferably provided between two sheets of glass constituting the laminated glass.

As described above, the projection image display member is a member for displaying a projection image by reflecting the projection image. Therefore, the projection image display member may be provided at a position where the projection image projected from the projector or the like can be visually displayed.

That is, the projection image display member according to the embodiment of the present invention functions as a combiner of the HUD. In the HUD, the combiner means an optical member that can display a screen image projected from a projector in a visible manner, and in a case where the combiner is observed from a surface side into which the projection image is incident, information on a surface side opposite to the surface side into which the projection light is incident can be observed at the same time. That is, the combiner functions as an optical path combiner for superimposing and displaying external light and light of a projection image.

The projection image display member may be provided on the entire surface of the windshield glass, or may be provided on a part of the windshield glass in a plane direction, but the projection image display member is preferably provided on a part of the windshield glass.

In a case where the projection image display member is provided on a part of the windshield glass, the projection image display member may be provided at any position on the windshield glass, but the projection image display member is preferably provided so that a virtual image is displayed at a position where the image can be easily visible from an observer such as a driver during the use of the HUD. For example, a position where the projection image display member is provided on the windshield glass may be determined from the relationship between a position of the driver's seat in the vehicle on which the HUD is mounted and a position where the projector is installed.

The projection image display member may have a flat surface shape having no curved surface, but may have a curved surface. In addition, the projection image display member may have a concave or convex shape as an entirety, and the projection image may be displayed to be enlarged or reduced.

[Laminated Glass]

The windshield glass may have a laminated glass configuration. The windshield glass according to the embodiment of the present invention is a laminated glass, and includes the projection image display member between a first glass plate and a second glass plate.

The windshield glass may have a configuration in which the projection image display member is disposed between the first glass plate and the second glass plate. However, the windshield glass preferably has a configuration in which the intermediate film is provided on at least one between the first glass plate and the projection image display member, or between the projection image display member and the second glass plate.

In the windshield glass, as an example, the first glass plate is disposed on a side (outside the vehicle) opposite to a side on which an image is seen in the HUD, and the second glass plate is disposed on the side on which an image is seen (inside the vehicle). In the windshield glass according to the embodiment of the present invention, the term "first" and "second" in the first glass plate and the second glass plate have no technical meanings, and are provided for convenience in order to distinguish two glass plates. Therefore, the first glass plate may be disposed inside the vehicle and the second glass plate may be disposed outside the vehicle.

As glass plates such as the first glass plate and the second glass plate, a glass plate generally used in the windshield glass can be used. For example, a glass plate having a visible light transmittance of 80% or less such as 73% or 76%, such as green glass having high heat shielding properties, may be used. Even in a case where a glass plate having a low visible light transmittance is used as described above, a windshield glass having a visible light transmittance of 70% or more in the projection image display member can be produced by using the projection image display member of the present invention.

The thickness of the glass plate is not particularly limited, and may be approximately 0.5 to 5.0 mm and is preferably 1.0 to 3.0 mm and more preferably 2.0 to 2.3 mm. Materials and thicknesses of the first glass plate and the second glass plate may be the same as or different from each other.

The windshield glass including the laminated glass structure can be manufactured by using a well-known producing method of a laminated glass.

In general, the laminated glass can be manufactured by a method of interposing the intermediate film for laminated glass between two glass plates, repeating a heating treatment and a pressurizing treatment several times, and finally performing the heating treatment under a pressurizing condition by using an autoclave. As the pressurizing treatment, a treatment using a rubber roller is exemplified. The heating treatment and the pressurizing treatment may be performed by a rubber roller.

As an example, the windshield glass having a laminated glass configuration including a projection image display member and an intermediate film may be produced by the above described method of producing a laminated glass after the projection image display member is formed on a surface of the glass plate, or may be produced by the above described method of producing a laminated glass using an intermediate film for the laminated glass including the above described projection image display member.

In a case where the projection image display member is formed on the surface of the glass plate, the glass plate on which the projection image display member is provided may be either the first glass plate or the second glass plate. In this case, the projection image display member is laminated to, for example, the glass plate with an adhesive.

(Intermediate Film)

As the intermediate film (intermediate film sheet or interlayer), any known intermediate film used as an intermediate film in the laminated glass can be used. For example, a resin film including a resin selected from the group consisting of polyvinylbutyral (PVB), an ethylene-vinyl acetate copolymer, and a chlorine-containing resin can be used. The resin is preferably a main component of the intermediate film. The main component refers to a component occupying 50% by mass or more of the intermediate film.

Among the resins, polyvinylbutyral and an ethylene-vinyl acetate copolymer are preferable, and polyvinylbutyral is more preferable. The resin is preferably a synthesis resin.

Polyvinylbutyral can be obtained by acetalizing polyvinyl alcohol with butyr aldehyde. A preferable lower limit of the degree of acetalizing of the polyvinylbutyral is 40%, a preferable upper limit thereof is 85%, a more preferable lower limit thereof is 60%, and a more preferable upper limit is 75%.

The polyvinyl alcohol is normally obtained by saponification of polyvinyl acetate, and polyvinyl alcohol having a degree of saponification of 80% to 99.8% by mol is generally used.

In addition, a preferable lower limit of the degree of polymerization of the polyvinyl alcohol is 200 and a preferable upper limit thereof is 3,000. In a case where the degree of polymerization of polyvinyl alcohol is 200 or more, the penetration resistance of the obtained laminated glass is unlikely to be lowered. In a case where the degree is 3,000 or less, the resin film has good moldability, and the rigidity of the resin film does not become too large. Thus, a good workability is achieved. A more preferable lower limit thereof is 500 and a more preferable upper limit is 2,000.

(Intermediate Film Including Projection Image Display Member)

The intermediate film for the laminated glass including the projection image display member can be formed by laminating the projection image display member on a surface of the above described intermediate film. Alternatively, the projection image display member may be formed to be sandwiched between the two intermediate films described above. The two intermediate films may be the same as each other or different from each other, and the same intermediate films are preferable.

A well-known bonding method can be used to laminate the projection image display member and the intermediate film, and a laminate treatment is preferably used. It is preferable that the laminate treatment is performed under heating and pressurizing conditions to some extent so that the laminate and the intermediate film are not peeled off from each other after processed.

In order to stably perform the laminating, a film surface temperature of a side on which the intermediate film is adhered is preferably 50° C. to 130° C. and more preferably 70° C. to 100° C.

The pressurization is preferably performed at the time of laminating. The pressurizing condition is not limited, but is preferably lower than 2.0 kg/cm$^2$ (less than 196 kPa), more preferably 0.5 to 1.8 kg/cm$^2$ (49 kPa to 176 kPa), and still more preferably 0.5 to 1.5 kg/cm$^2$ (49 kPa to 147 kPa).

In a case where the projection image display member includes a support, the support may be peeled off at the same time as laminating, immediately after laminating, or immediately before laminating. That is, the projection image display member attached to the intermediate film obtained after laminating may not have a support.

An example of a method of manufacturing an intermediate film including the projection image display member includes, (1) a first step of laminating the projection image display member to a surface of a first intermediate film to obtain a first laminate, and (2) a second step of laminating a second intermediate film on a surface opposite to the surface on which the first intermediate film of the projection image display member in the first laminate is laminated.

For example, in the first step, the projection image display member and the first intermediate film are laminated such that the support and the first intermediate film do not face each other. Next, the support is peeled off from the projection image display member. Furthermore, in the second step, the second intermediate film is laminated on the surface from which the support has been peeled off. Thereby, it possible to manufacture the intermediate film including the projection image display member having no support. In addition, by using the intermediate film including the projection image display member, the laminated glass in which the projection image display member does not have the support can be easily produced.

In order to stably peel the support without breakage or the like, the temperature of the support in a case of peeling the support off from the projection image display member is preferably 40° C. or higher, and more preferably 40° C. to 60° C.

[Layer on Visible Side with Respect to Selective Reflection Layer]

In general, in the projection image display member, an image based on reflected light from a layer reflecting projection light and an image based on reflected light from a front surface of the projection image display member as seen from a light incidence side or a back surface are superimposed, and thus, a problem of a double image or a multiple image occurs.

In the windshield glass, the light transmitted through the selective reflection layer is circular polarization with an opposite sense to circular polarization reflected by the selective reflection layer, and in a case where a layer positioned closer to the back surface than the selective reflection layer has low birefringence, light reflected by the back surface is difficult to generate a remarkable double image since most of polarization is usually reflected by the selective reflection layer.

By using polarization as projection light, most of projection light can be configured to be reflected by the selective reflection layer.

On the other hand, due to the reflected light generated by reflecting the projection light on the incidence surface of the windshield glass, a remarkable double image can be generated. Particularly, in a case where the distance from the center of the selective reflection layer in the thickness direction to the surface of the windshield glass, on which the projection light is incident, is a certain value or more, the double image may be remarkable. Specifically, in the windshield glass structure of the present invention, in a case where the total thickness of the layers positioned closer to the phase difference layer side than the selective reflection layer, that is, the distance from the surface on the visible side of the selective reflection layer to the surface of the windshield glass, on which the projection light is incident, is 0.5 mm or more, a remarkable double image may be obtained, in a case of 1 mm or more, a more remarkable double image may be obtained, in a case of 1.5 mm or more, an even more remarkable double image may be obtained, and in a case of 2.0 mm or more, a particularly remarkable double image may be obtained. The total thickness of the layers positioned closer to the phase difference layer side than the selective reflection layer does not include the thickness of the selective reflection layer.

The layers positioned closer to the visible side than the selective reflection layer include the support, the intermediate film, and the second glass plate in addition to the phase difference layer.

However, by using the projection image display member that selectively reflects p-polarization and displaying the projection image based on p-polarization, the projection image can be visually recognized without a remarkable double image even in a case where the total thickness of the layers positioned closer to the visible side than the selective reflection layer of the windshield glass is as described above.

<Head-Up Display System (HUD)>

The windshield glass can be used as a constituting member of the HUD. The HUD preferably includes a projector.

[Projector]

The "projector" is a "device projecting light or a screen image", includes a "device projecting a drawn image", and emits projection light carrying and supporting a screen image to be displayed. In the HUD according to the embodiment of the present invention, the projector emits projection light of p-polarization.

In the HUD, the projector may be disposed so that projection light of p-polarization that carries and supports a screen image to be displayed can enter the projection image display member in the windshield glass at an oblique incidence angle.

In the HUD, the projector includes a drawing device, and preferably displays, as a virtual image by reflection, a screen image (real image) drawn on a small intermediate image screen using a combiner.

A known projector used for the HUD can be used as long as the projector can emit the projection light of p-polarization. In addition, in the projector, an imaging distance of the virtual image, that is, a virtual image formation position is preferably variable.

Examples of a method of changing an imaging distance of a virtual image in the projector include a method in which a surface (screen) on which a screen image is generated is moved (refer to JP2017-21302A), a method in which a plurality of optical paths having different optical path lengths are changed (refer to WO2015/190157A), a method in which the optical path length is changed by inserting and/or moving mirrors, a method in which the focal length is changed by using a compound lens as an imaging lens, a method in which a projector 22 is moved, a method in which a plurality of projectors having different imaging distances of virtual images are changed and used, and a method in which a variable-focal-length lens is used (refer to WO2010/116912A).

The projector may be a projector in which the imaging distance of a virtual image is continuously changeable or a projector in which the imaging distance of a virtual image can be changed at two or three more points.

Herein, the imaging distances of at least two virtual images among virtual images of projection light from the projector are preferably different from each other by 1 m or more. Therefore, in a case where the imaging distance of a virtual image can be continuously changed in the projector, the imaging distance of a virtual image is preferably changeable by 1 m or more. Such a projector is preferably used since the projector can suitably handle the case where the distance of line of sight of a driver is considerably different between driving at a normal speed on the general road and driving at a high speed on the expressway.

(Drawing Device)

The drawing device may itself be a device displaying a screen image or a device emitting light capable of drawing a screen image.

In the drawing device, light from the light source may be adjusted by a drawing method such as an optical modulator, laser luminance modulation unit, optical deflection unit for drawing, or the like. The drawing device includes a light source, and means a device including an optical modulator, laser luminance modulation unit, optical deflection unit for drawing, or the like according to the drawing method.

(Light Source)

The light source is not limited, and known light sources used in projectors, drawing devices, and displays, such as light-emitting diodes (LEDs), organic light-emitting diodes (OLEDs), discharge tubes, and laser light sources, may be used.

Among these, LEDs and discharge tubes are preferred since they are suitable for a light source of a drawing device that emits linear polarization, and LEDs are particularly preferred. As the emission wavelength is not continuous in the visible light region, LEDs are suitable for combination with a combiner in which a cholesteric liquid crystal layer exhibiting selective reflection in a specific wavelength range is used as described later.

(Drawing Method)

The drawing method can be selected according to a light source to be used, and the like, and is not particularly limited.

Examples of the drawing method include a fluorescent display tube, a liquid crystal display (LCD) method using a liquid crystal, a liquid crystal on silicon (LCOS) method, DLP (Digital Light Processing) (registered trademark) method, a scanning method using a laser, and the like. The drawing method may be a method using a fluorescent display tube integrated with a light source. The LCD method is preferred as the drawing method.

In the LCD method and the LCOS method, light beams having respective colors are modulated and multiplexed by the optical modulator, and a light beam is emitted from a projection lens.

The DLP method is a display system using a digital micromirror device (DMD), in which micromirrors corresponding to the number of pixels are disposed, the drawing is performed and light is emitted from the projection lens.

The scanning method is a method of scanning a screen with light rays and imaging using an afterimage in eyes. For example, the description of JP1995-270711A (JP-H7-270711A) and JP2013-228674A can also be referred to. In the scanning method using the laser, a luminance modulated laser beam having each color of, for example, red light, green light, and blue light may be bundled into one ray of light by a multiplexing optical system or a condenser lens, the scanning may be performed with the ray of light by the optical deflection unit, and the ray of light may be drawn on an intermediate image screen to be described later.

In the scanning method, the luminance modulation of a laser beam having each color of, for example, red light, green light, and blue light may be performed directly by changing an intensity of the light source, or may be performed by an external modulator. Examples of the optical deflection unit include a galvanometer mirror, a combination of a galvanometer mirror and a polygon mirror, and a micro electro mechanical system (MEMS), and among these, MEMS is preferable. The scanning method includes a random scan method, a raster scan method, or the like, and a raster scan method is preferable. In the raster scan method, the laser beam can be driven, for example, with a resonance frequency in a horizontal direction and with a saw-tooth wave in a vertical direction. Since the scanning method does not require the projection lens, it is easy to miniaturize the device.

Light emitted from the drawing device may be linear polarization or natural light (unpolarization).

In a drawing device using a drawing method of the LCD method or the LCOS method and a drawing device using a laser light source, light emitted from the drawing device is essentially linear polarization. In the case where a drawing device in which the emitted light is linear polarization and includes light beams having a plurality of wavelengths (colors), the polarization directions (transmission axis directions) of polarization in a plurality of light beams are preferably the same as each other. As commercially available drawing devices, it is also known that a device has non-uniform polarization directions in wavelength ranges of red light, green light, and blue light included in the emitted light (refer to JP2000-221449A). Specifically, an example is known that the polarization direction of the green light is orthogonal to the polarization direction of the red light and the polarization direction of the blue light.

As described above, in the HUD according to the embodiment of the present invention, the projection light emitted by the projector is p-polarization.

(Intermediate Image Screen)

As described above, the drawing device may use an intermediate image screen. The "intermediate image screen" is a screen on which a screen image is drawn. That is, in a case where light emitted from the drawing device is not yet visible as a screen image, the drawing device forms a screen image visible on the intermediate image screen using the light. The screen image drawn on the intermediate image screen may be projected on the combiner by light transmitted through the intermediate image screen, and may be reflected on the intermediate image screen and then projected on the combiner.

Examples of the intermediate image screen include a scattering film, a microlens array, a screen for rear projection, and the like. In a case where a plastic material is used as the intermediate image screen, assuming that the intermediate image screen has birefringence, a polarization plane and a light intensity of the polarization incident on the intermediate image screen are in disorder, and color unevenness or the like is likely to occur in the combiner (projection image display member). However, by using a phase difference film having a predetermined phase difference, the problem of generating color unevenness can be reduced.

It is preferable that the intermediate image screen has a function of spreading and transmitting incident rays. This is because an enlarged projection image can be displayed. An example of the intermediate image screen includes a screen composed of a microlens array. The microlens array used in the HUD is described in, for example, JP2012-226303A, JP2010-145745A, and JP2007-523369A.

The projector may include a reflecting mirror which adjusts an optical path of projection light formed by the drawing device.

As the HUD using the windshield glass as the projection image display member, descriptions disclosed in JP1990-141720A (JP-H02-141720A), JP1998-096874A (JP-H10-096874A), JP2003-98470A, U.S. Pat. No. 5,013,134A, and JP2006-512622A can be referred to.

The windshield glass is particularly effective for the HUD used in combination with a projector using lasers, LEDs, or organic light-emitting diodes (OLEDs) in which an emission wavelength is not continuous in a visible light region as a light source. This is because, the selective reflection center wavelength of the cholesteric liquid crystal layer can be adjusted in accordance with each emission wavelength. In addition, the windshield glass can also be used for projection of a display such as a liquid crystal display device (LCD) in which display light is polarized.

[Projection Light (Incident Light)]

The incident light is preferably incident at an oblique incidence angle of 45° to 70° with respect to the normal line of the projection image display member. The Brewster's angle at an interface between the glass having a refractive index of approximately 1.51 and the air having a refractive index of 1 is approximately 56°. The p-polarization is allowed to incident in the range of the angle, and thereby the amount of the reflected light which is reflected from the surface of the windshield glass on the visible side with respect to the selective reflection layer and from which the incidence ray for the projection image display is reflected is small. Therefore, it is possible to perform an image display with a decreased effect of a double image.

The above described angle is also preferably set as 50° to 65°. At this time, it is preferable to have a configuration in which an observation of the projection image can be performed at an angle of 45° to 70°, preferably 50° to 65° on a side opposite to a side on which light is incident, with respect to the normal line of the selective reflection layer in the side on which projection light is incident.

The incident light may be incident in any direction of upwards, downwards, rightwards, and leftwards of the windshield glass, and may be determined in accordance with a visible direction. For example, the projected light is preferably incident at an obliquely incident angle from the bottom during the use.

The slow axis of the phase difference layer in the projection image display member of the windshield glass is preferably at an angle of 30° to 85° or 120° to 175° with respect to a vibration direction of the incident p-polarization, depending on the front phase difference of the phase difference layer. The vibration direction of the incident p-polarization is, that is, the incidence surface of the incident light.

As described above, the projection light in a case of displaying the projection image in the HUD according to the embodiment of the present invention is p-polarization vibrating in the direction parallel to the incidence surface.

In a case where the light emitted from the projector is not linear polarization, the light may be converted into p-polarization by providing a linear polarization film (polarizer) on the light emitting side of the projector, or the light may be converted into p-polarization by a known method of using the linear polarization film on an optical path between the projector and the windshield glass. In this case, it is considered that a member converting projection light that is not linear polarization into p-polarization is also included in the projector of the HUD according to the embodiment of the present invention.

As described above, in the projector whose polarization direction is not uniform in the wavelength ranges of red light, green light, and blue light of the emitted light, the polarization direction is preferably adjusted in a wavelength selective manner, and light is incident in all color wavelength ranges as p-polarization.

As described above, the HUD (projector) may be a projection system in which a virtual image formation position is variable. The virtual image formation position is variable so that the driver can visually confirm the virtual image more comfortably and conveniently.

The virtual image formation position is a position at which the driver of the vehicle can visually confirm a virtual image, and for example, a position positioned 1000 mm or more away from the front of the windshield glass as seen from a normal driver.

Herein, in a case where the glass is non-uniform (wedge-shaped) at the projection image display member as described in the above-mentioned JP2011-505330A, assuming that the virtual image formation position is changed, it is necessary to change the angle of the wedge-shaped. Therefore, for example, as described in JP2017-015902A, it is necessary to respond artificially to the change of the virtual image formation position by partially changing the angle of the wedge shape to change the projection position.

However, in the HUD according to the embodiment of the present invention in which the windshield glass according to the embodiment of the present invention and p-polarization are used as described above, it is not necessary to use the wedge-shaped glass, and the thickness of the glass is made uniform in the projection image display member. Therefore, the projection system in which the above described virtual image formation position is variable can be suitably adopted.

Next, the HUD will be described more specifically with reference to FIG. 3 and FIG. 4.

Figure 3:
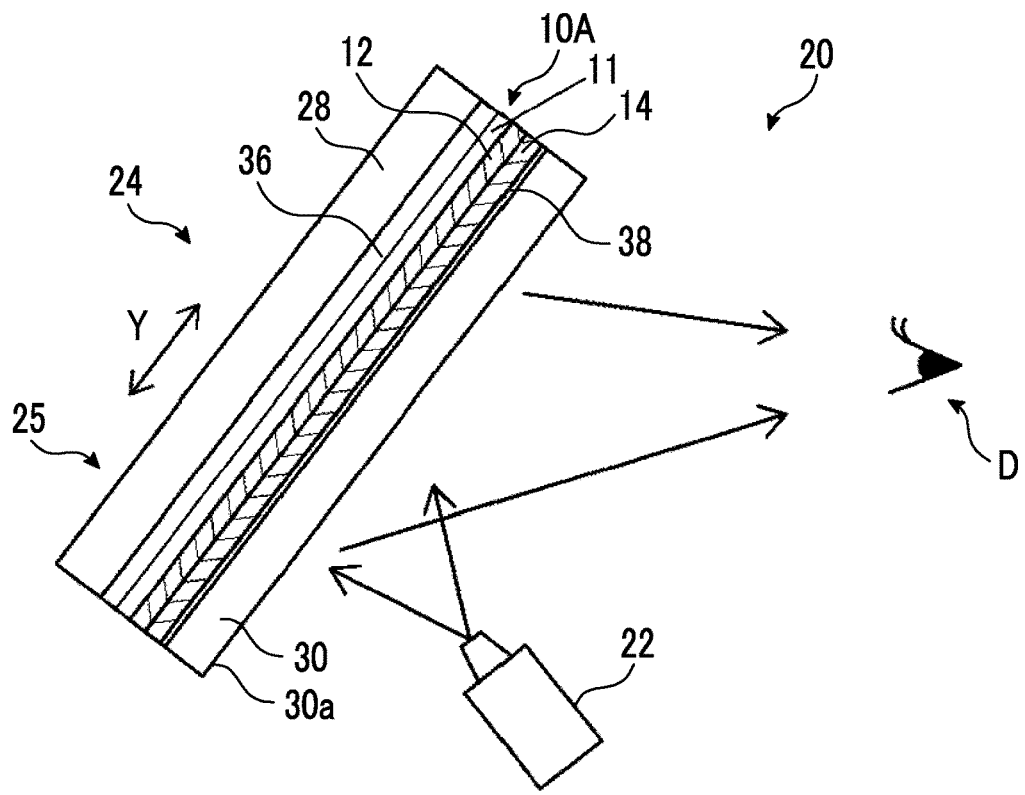
FIG. 3 is a schematic diagram illustrating an example of a head-up display including a projection image display member according to the embodiment of the present invention.
Figure 4:
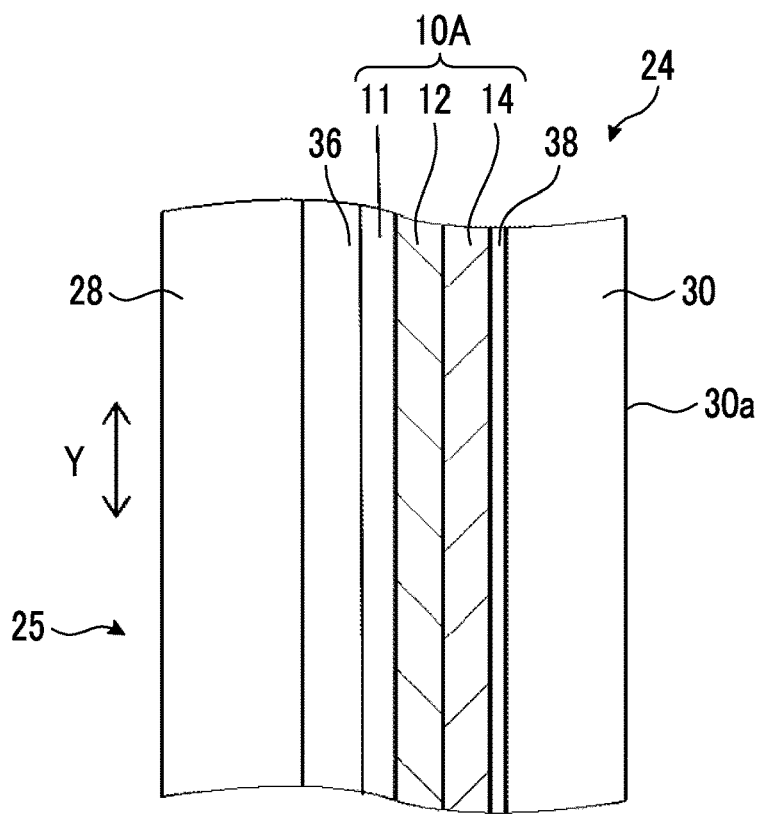
FIG. 4 is a schematic diagram illustrating an example of a windshield glass including the projection image display member according to the embodiment of the present invention.

FIG. 3 is a schematic diagram illustrating an example of the head-up display including the projection image display member according to the embodiment of the present invention, and FIG. 4 is a schematic diagram illustrating an example of the windshield glass including the projection image display member according to the embodiment of the present invention.

The HUD 20 includes the projector 22 and a windshield glass 24, and is used for a vehicle such as a passenger car, for example. Each component in the HUD 20 has already been described.

In the HUD 20, as conceptually illustrated in FIG. 4, the windshield glass 24 includes a first glass plate 28 corresponding to the first glass plate, a second glass plate 30 corresponding to the second glass plate, and a projection image display member 10A, an intermediate film 36, and an adhesive layer 38.

The projection image display member 10A is obtained by peeling the support 15 from the projection image display member 10 illustrated in FIG. 1, and includes the polarization conversion layer 11, the selective reflection layer 12, and the phase difference layer 14. In the HUD 20, the up and down direction Y of the windshield glass 24 and the axis H of the phase difference layer 14 illustrated in FIG. 2 are disposed to be aligned with each other. In the windshield glass (HUD) according to the embodiment of the present invention, the projection image display member may include the support 15.

The up and down direction Y of the windshield glass 24 is a direction corresponding to the vertical direction of the vehicle or the like on which the windshield glass 24 is disposed, and is a direction in which the ground side is the lower side and the side opposite to the lower side is the upper side. In the case where the windshield glass 24 is disposed in a vehicle or the like, the windshield glass 24 may be disposed in an inclined manner for the sake of convenience of structure or design, and in this case, the up and down direction Y corresponds to a direction along a surface 25 of the windshield glass 24. The surface 25 is the outer surface side of the vehicle.

The projector 22 has been described above. A known projector used for the HUD can be used as long as the projector 22 can emit the projection light of p-polarization that carries and supports a screen image to be displayed. In addition, in the projector 22, an imaging distance of the virtual image, that is, a virtual image formation position is preferably variable.

In the HUD 20, the projector 22 emits the projection light of p-polarization to the windshield glass 24 (the second glass plate 30). Since the projector 22 converts the projection light emitted to the windshield glass 24 into p-polarization, the reflection of the projection light by the second glass plate 30 and the first glass plate 28 of the windshield glass 24 is significantly reduced, and disadvantages that a double image is observed, and the like can be suppressed.

The projector 22 preferably emits the projection light of p-polarization to the windshield at the Brewster's angle. Therefore, the reflection of the projection light by the second glass plate 30 and the first glass plate 28 is eliminated, which allows display of a clearer screen image.

The windshield glass 24 is a so-called laminated glass and includes the intermediate film 36, the projection image display member 10A, and the adhesive layer 38 between the first glass plate 28 and the second glass plate 30.

As described above, the projection image display member 10A is formed by laminating the polarization conversion layer 11, the selective reflection layer 12, and the phase difference layer 14, and the phase difference layer 14 is disposed on the second glass plate 30 side, that is, the side on which the projection light is incident. The projection light emitted from the projector 22 is incident on a surface 30a of the second glass plate 30. The projection image display member 10A reflects p-polarization, and an angle and an alignment of the slow axis Sa with respect to the axis H of the phase difference layer 14 illustrated in FIG. 2, that is, the up and down direction Y and the sense of circular polarization reflected by the selective reflection layer 12 is set to reflect the p-polarization as described above.

The selective reflection layer 12 is preferably a cholesteric liquid crystal layer, which selectively reflects a predetermined circular polarization within a predetermined wavelength range and transmits other light. As described above, the selective reflection layer 12 may include a first selective reflection layer 12G that reflects light having a wavelength of 495 to 570 nm (green light) in a wavelength selective manner and a second selective reflection layer 12R that reflects light having a wavelength of 620 to 750 nm (red light) in a wavelength selective manner.

The projection image display member 10 is attached to the first glass plate 28 via the intermediate film 36, and is attached to the second glass plate 30 via the adhesive layer 38, and is sandwiched between the first glass plate 28 and the second glass plate 30.

In the present invention, the first glass plate 28 and the second glass plate 30 of the windshield glass 24 are basically provided in parallel. That is, the cross section of the windshield glass 24 according to the embodiment of the present invention is not wedge-shaped.

The first glass plate 28 and the second glass plate 30 are both known glass (glass plates) used for windshields of vehicles and the like. Therefore, forming materials, thicknesses, shapes, and the like may be the same as those of glass used for known windshields. The first glass plate 28 and the second glass plate 30 illustrated in FIG. 4 are both flat-shaped plates, but the present invention is not limited thereto, and a part thereof may be a curved surface or the entire surface may be a curved surface.

The intermediate film 36 prevents the glass from being broken and scattering in a vehicle in the event of an accident, and furthermore is used to adhere the projection image display member 10A to the first glass plate 28. As the intermediate film 36, a known intermediate film (interlayer) used for the windshield of a laminated glass can be used. Examples of the forming materials for the intermediate film 36 include polyvinyl butyral (PVB), ethylene-vinyl acetate copolymer, chlorine-containing resin, polyurethane, and the like.

Further, a thickness of the intermediate film 36 is not limited, and the thickness depending on the forming materials or the like may be set in the same manner as the intermediate film of the known windshield glass.

The adhesive layer 38 is, for example, a layer formed of a coating-type adhesive. The projection image display member 10A is attached to the second glass plate 30 using the adhesive layer 38. In the windshield glass according to the embodiment of the present invention, the projection image display member 10A may be attached to the second glass plate via the intermediate film 36 instead of the adhesive layer 38. In addition, in a case where the projection image display member 10A is smaller than the intermediate film 36 to which the first glass plate 28 and the projection image display member 10A are attached, the intermediate film 36 may be used to attach the projection image display member 10A to the second glass plate 30.

The adhesive layer 38 is not limited as long as the adhesive layer 38 can secure the transparency required for the windshield glass 24 and can attach the projection image display member 10 to the glass with the necessary adhesive force, and various known coating-type adhesives are available. The adhesive layer 38 may be the same as the intermediate film 36 such as PVB. In addition to this, an acrylate-based adhesive or the like can also be used for the adhesive layer 38. As the adhesive layer 38, the same adhesive layer as described above may be used as illustrated below.

The adhesive layer 38 may be formed of the same adhesive used in the above described adhesive layer.

From the viewpoint of the curing-type, adhesives are classified into hot-melt adhesives, thermosetting adhesives, photosetting adhesives, reaction-setting adhesives, and pressure-sensitive adhesives requiring no curing. In addition, as the adhesives of any type, acrylate-based, urethane-based, urethane acrylate-based, epoxy-based, epoxy acrylate-based, polyolefin-based, modified olefin-based, polypropylene-based, ethylene vinyl alcohol-based, vinyl chloride-based, chloroprene rubber-based, cyanoacrylate-based, polyamide-based, polyimide-based, polystyrene-based, and polyvinylbutyral-based compounds can be used.

From viewpoints of workability and productivity, a photocuring method is preferable as a curing method, and from viewpoints of optical transparency and heat resistance, the acrylate-based, urethane acrylate-based, and epoxy acrylate-based compounds are preferably used as the material.

The adhesive layer 38 may be formed using a highly transparent adhesive transfer tape (OCA tape). A commercially available product for an image display device, in particular, a commercially available product for the surface of the image display portion of an image display device may be used as the highly transparent adhesive transfer tape. Examples of commercially available products include pressure sensitive adhesive sheets (such as PD-S1) manufactured by Panac Co., Ltd., and pressure sensitive adhesive sheets of MHM series manufactured by NICHIEI KAKOH CO., LTD.

The thickness of the adhesive layer 38 is not limited. Therefore, depending on the material for forming the adhesive layer 38, the thickness at which sufficient adhesive force can be obtained may be appropriately set.

Herein, in a case where the adhesive layer 38 is excessively thick, the projection image display member 10 may not be attached to the first glass plate 28 or the second glass plate 30 while the planarity is sufficiently maintained. In consideration of this point, the thickness of the adhesive layer 38 is preferably 0.1 to 800 μm, and more preferably 0.5 to 400 μm.

In the windshield glass 24, the adhesive layer 38 is provided between the projection image display member 10 and the second glass plate 30, and the projection image display member 10 and the first glass plate 28 are attached to each other using the intermediate film 36, but the configuration of the windshield glass 24 is not limited thereto. That is, an adhesive layer may be provided between the projection image display member 10 and the first glass plate 28, and an intermediate film may be provided between the projection image display member 10 and the second glass plate 30.

In addition, the windshield glass 24 does not have the intermediate film 36, and the adhesive layer 38 may be used to attach the projection image display member 10 to the first glass plate 28, and attach the projection image display member 10 to the second glass plate 30.

The projection image display member 10 is a laminate of the selective reflection layer 12 and the phase difference layer 14. The projection image display member 10A including the phase difference layer 14 is provided with the phase difference layer 14 facing the second glass plate 30 side, that is, the incidence side of projection light.

In the HUD 20, the windshield glass 24 includes a configuration in which the projection image display member 10A is included between the first glass plate 28 and the second glass plate 30, the projection image display member 10A (phase difference layer 14) is attached to the second glass plate 30 using the adhesive layer 38, and the projection image display member 10A (polarization conversion layer 11) is attached to the first glass plate 28 using the intermediate film 36.

As illustrated in FIG. 3, in the HUD 20, an observer of a screen image, that is, a driver D observes a virtual image of the projection image formed by the projector 22 through projection by the projector 22 and reflection by the windshield glass 24.

In a typical HUD, a projection image of a projector is reflected by glass of a windshield, and the resulting reflected light is observed. Herein, a typical windshield is a laminated glass and includes two sheets of glass on the inner surface side and the outer surface side. Therefore, there is a problem in such an HUD that a driver observes double images through reflected light from the two sheets of glass.

In order to deal with this problem, in a typical HUD, the cross section of the windshield (intermediate film) has a wedge shape so that the reflection at the inner-side glass and the reflection at the outer-side glass overlap each other, thus preventing observation of double images.

However, as described above, in a wedge-shaped windshield, in a case where the imaging distance of a virtual image is changed to handle the difference in line of sight of a driver between normal driving with a short line of sight and high-speed driving with a long line of sight, the angle of the wedge of the windshield is inappropriate. Consequently, the driver observes double images.

On the other hand, in the HUD 20 according to the embodiment of the present invention, the projector 22 projects p-polarization, the windshield glass 24 includes the projection image display member 10A reflecting p-polarization between the first glass plate 28 and the second glass plate 30, and the driver D observes reflected light from the projection image display member 10A. In such a configuration, regarding the reflection of projection light from the projector 22, the reflection by the projection image display member 10 is basically dominant, so that double images are basically not formed.

Therefore, in the HUD 20 using the projection image display member 10A according to the embodiment of the present invention in the windshield glass 24, the cross section of the windshield glass 24 (intermediate film 36) does not necessarily have a wedge shape. Thus, even though the imaging distance of a virtual image is changed, double images are not formed.

The present invention is basically configured as described above. Although the projection image display member, the windshield glass, and the head-up display system (HUD) according to the embodiment of the present invention have been described in detail above, the present invention is not limited to the above described embodiment, and various modifications and changes may be made without departing from the spirit of the present invention.

EXAMPLES

The features of the present invention will be described in detail with reference to the following examples. Materials, reagents, amounts of substances and percentages thereof, and operations shown in the following examples can be suitably changed within a range not departing from the gist of the present invention. Therefore, the ranges of the present invention are not limited to the following examples.

Examples 1 to 15 and Comparative Examples 4 to 8 were produced by methods described below. Comparative Examples 1 and 2 were produced in the same manner as in other Examples and Comparative Examples, except that the polarization conversion layer was not provided, and in Comparative Example 3, the phase difference layer and the polarization conversion layer were not provided.

<Preparation of Coating Liquid>

(Cholesteric Liquid Crystal Layer-Forming Coating Liquids 1 and 2)

Regarding a cholesteric liquid crystal layer-forming coating liquid 1 used to form a cholesteric liquid crystal layer, which has a selective reflection center wavelength of 590 nm, and a cholesteric liquid crystal layer-forming coating liquid 2 used to form a cholesteric liquid crystal layer, which has a selective reflection center wavelength of 720 nm, the following components were mixed to prepare a cholesteric liquid crystal layer-forming coating liquid having the following composition.

Mixture 1 100 parts by mass
Fluorine-based horizontal alignment agent 1 (alignment controlling agent 1)
Fluorine-based horizontal alignment agent 2 (alignment controlling agent 2) 0.02 parts by mass
Dextrorotatory chiral agent LC756 (manufactured by BASF SE) adjusted in accordance with theta get reflection wavelength
Polymerization initiator IRGACURE OXE01 (manufactured by BASF SE) 1.0 part by mass
Solvent (methyl ethyl ketone)
    such an amount that the solute concentration was 20% by mass Mixture 1

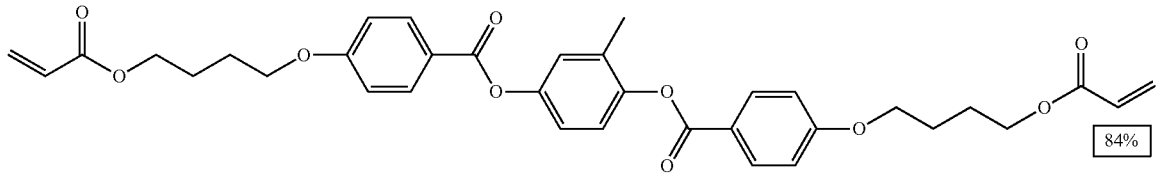

84%

-continued

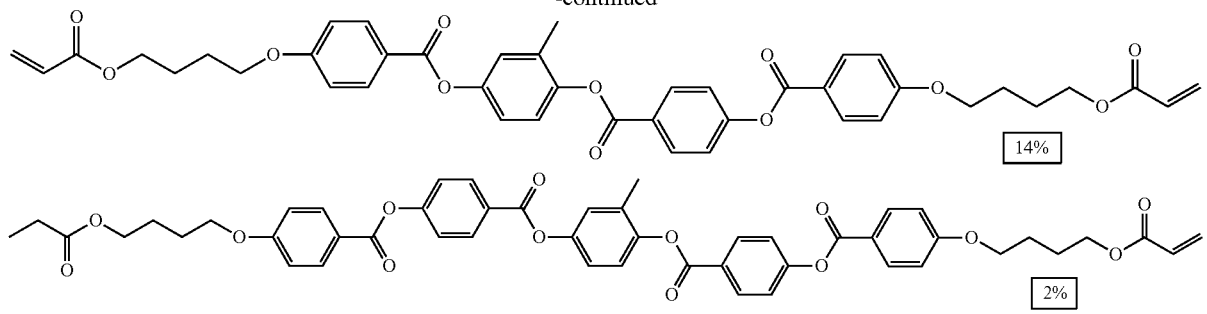

The numerical values are represented by % by mass

Alignment controlling agent 1

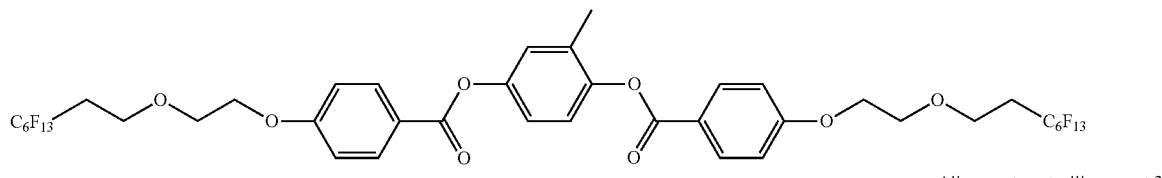

Alignment controlling agent 2

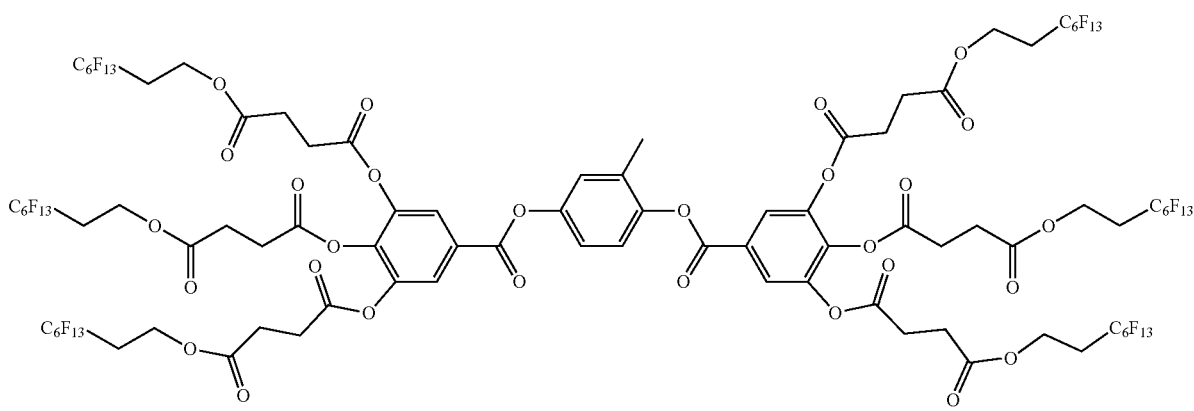

The prescription amount of the dextrorotatory chiral agent LC756 having the above described coating liquid composition was adjusted to prepare the cholesteric liquid crystal layer-forming coating liquid 1 and the cholesteric liquid crystal layer-forming coating liquid 2.

A single cholesteric liquid crystal layer having a film thickness of 3 mm was produced on a temporary support in the same manner as the production of a half-mirror described below using the cholesteric liquid crystal layer-forming coating liquid 1 and the cholesteric liquid crystal layer-forming coating liquid 2, and the reflection characteristics in the visible light region were confirmed.

As a result, all the produced cholesteric liquid crystal layers were right circular polarization reflection layers, and the selective reflection center wavelength (center wavelength) of the cholesteric liquid crystal layer obtained from the cholesteric liquid crystal layer-forming coating liquid 1 is a wavelength of 590 nm, and the selective reflection center wavelength of the cholesteric liquid crystal layer obtained from the cholesteric liquid crystal layer-forming coating liquid 2 is a wavelength of 720 nm.

(Phase Difference Layer-Forming Coating Liquid)

The following components were mixed to prepare a phase difference layer-forming coating liquid having the following composition.

Mixture 1 100 parts by mass
Fluorine-based horizontal alignment agent 1 (alignment controlling agent 1) parts by mass
Fluorine-based horizontal alignment agent 2 (alignment controlling agent 2) parts by mass
Polymerization initiator IRGACURE OXE01 (manufactured by BASF SE)
Solvent (methyl ethyl ketone)
such an amount that the solute concentration was 20% by mass (Polarization Conversion Layer-Forming Coating Liquid)

The following components were mixed to prepare a polarization conversion layer-forming coating liquid having the following composition.

Mixture 1 100 parts by mass
Fluorine-based horizontal alignment agent 1 (alignment controlling agent 1) parts by mass
Fluorine-based horizontal alignment agent 2 (alignment controlling agent 2) parts by mass
Dextrorotatory chiral agent LC756 (manufactured by BASF SE)
adjusted in accordance with the target number of pitches and the reflection wavelength that matches the film thickness
Polymerization initiator IRGACURE OXE01 (manufactured by BASF SE) 1.0 part by mass Solvent (methyl ethyl ketone) such an amount that the solute concentration was 20% by mass In a case where the prescription amount of the dextrorotatory chiral agent LC756 having the above described coating liquid composition was adjusted to obtain the cholesteric liquid crystal layer, the polarization conversion layer-forming coating liquid prepared to have a desired selective reflection center wavelength k. The selective reflection center wavelength λ was determined by measuring a single cholesteric liquid crystal layer having a film thickness of 3 µm, which is produced on the temporary support, by FTIR (Spectrum Two manufactured by PerkinElmer Inc.).

The film thickness d of the helical structure can be represented by "the pitch P×the number of pitches of the helical structure". As described above, the pitch P of the helical structure is a length of one pitch in the helical structure, and one pitch is that the director of the liquid crystal compound helically aligned is rotated by 360°. In the cholesteric liquid crystal layer, the selective reflection center wavelength λ coincides with "the length P of one pitch×the average refractive index n in the plane" (λ=P×n). Therefore, the pitch P is "the selective reflection center wavelength λ/the average refractive index n in the plane" (P=λ/n).

Thus, in a case where the cholesteric liquid crystal layer was obtained, the polarization conversion layer-forming coating liquid was prepared so that the selective reflection center wavelength λ became a desired wavelength. In the formation of the polarization conversion layer described later, the polarization conversion layer-forming coating liquid was applied to have a desired film thickness, the polarization conversion layer was formed, and the number of pitches was determined.

The combinations of the number of pitches, the film thickness, and the selective reflection center wavelength λ (center wavelength λ) of the target polarization conversion layer of the prepared polarization conversion layer-forming coating liquid are illustrated in Table 1.

TABLE 1

| | Polarization conversion layer | | |
|---|---|---|---|
| | Number of pitches | Film thickness | Center wavelength λ |
| Example 1 | 0.5 | 1.5 µm | 4650 nm |
| Example 2 | 0.5 | 1.5 µm | 4650 nm |
| Example 3 | 0.75 | 2 µm | 4150 nm |
| Example 4 | 1 | 2.4 µm | 3730 nm |
| Example 5 | 2 | 3 µm | 2330 nm |
| Example 6 | 3 | 3.5 µm | 1800 nm |
| Example 7 | 4 | 3.5 µm | 1350 nm |
| Example 8 | 5 | 4 µm | 1100 nm |
| Example 9 | 6 | 4 µm | 1040 nm |
| Example 10 | 7 | 4.5 µm | 1000 nm |
| Example 11 | 0.31 | 1 µm | 5000 nm |
| Example 12 | 0.39 | 2 µm | 8000 nm |
| Example 13 | 1.04 | 2 µm | 3000 nm |
| Example 14 | 1.17 | 3 µm | 4000 nm |
| Example 15 | 0.58 | 3 µm | 8000 nm |
| Example 16 | 0.39 | 2 µm | 8000 nm |
| Comparative Example 1 | No polarization conversion layer | | |
| Comparative Example 2 | No polarization conversion layer | | |
| Comparative Example 3 | No polarization conversion layer | | |
| Comparative Example 4 | 0.25 | 0.3 µm | 1860 nm |
| Comparative Example 5 | 0.25 | 0.7 µm | 4350 nm |
| Comparative Example 6 | 2 | 7 µm | 5440 nm |
| Comparative Example 7 | 5 | 9 µm | 2800 nm |
| Comparative Example 8 | 7 | 10 µm | 2230 nm |

<Saponification of Cellulose Acylate Film>

A cellulose acylate film having a thickness of 40 µm was produced by the same production method as in Example 20 described in WO2014/112575A.

The produced cellulose acylate film passed through a dielectric heating roll having a temperature of 60° C., and a temperature at the film surface was increased to 40° C. Thereafter, one side of the film was coated with an alkaline solution in the composition provided as below at a coating amount of 14 ml/m² by using a bar coater and was allowed to stay under a steam-type far infrared heater (manufactured by Noritake Co., Ltd.) heated to 110° C. for 10 seconds.

Next, pure water was applied at 3 ml/m² by using a bar coater in the same manner. Next, washing with water using a fountain coater and dewatering using an air knife were repeated three times, staying in a drying zone at 70° C. was performed for 5 seconds, and drying was performed to produce a cellulose acylate film subjected to the saponification treatment.

The in-plane phase difference of the saponified cellulose acylate film was measured by AxoScan and found to be 1 nm.

Alkaline Solution Composition
  Potassium hydroxide 4.7 parts by mass
  Water 15.7 parts by mass
  Isopropanol 64.8 parts by mass
  Surfactant ($C_{16}H_{33}O(CH_2CH_2O)_{10}H$) 1.0 part by mass
  Propylene glycol 14.9 parts by mass <Formation of Alignment Film>

The saponified surface of the saponified cellulose acylate film (transparent support) is coated with an alignment film-forming coating liquid having a composition illustrated below by a wire bar coater at 24 mL/m², and dried with hot air at 100° C. for 120 seconds.

Composition of Alignment Film-Forming Coating Liquid
  Modified polyvinyl alcohol illustrated below 28 parts by mass
  Citric acid ester (AS3, manufactured by Sankyo Chemical Co., Ltd.) 1.2 parts by mass
  Photoinitiator (IRGACURE 2959, manufactured by BASF SE) 0.84 parts by mass
  Glutaraldehyde 2.8 parts by mass
  Water 699 parts by mass
  Methanol 226 parts by mass

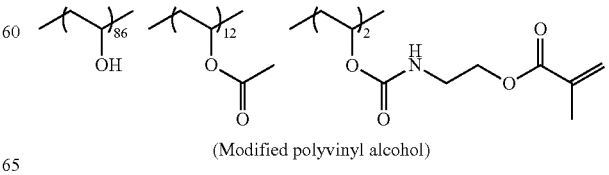

(Modified polyvinyl alcohol)

<Production of Projection Image Display Member>

The cellulose acylate film on which the alignment film was formed was used as a support.

Rubbing treatment (rayon cloth, pressure: 0.1 kgf (0.98 N), rotation speed: 1000 revolutions per minute (rpm), transport speed: 10 m/min, and the number of times: 1 round trip) on one side of the support in a direction rotated 45° clockwise with respect to the long side direction of the support (see FIG. 2) was performed.

The phase difference layer-forming coating liquid was applied to the rubbed surface of the alignment film on the support using a wire bar, and then dried.

Next, the coated result was placed on a hot plate at 50° C. and irradiated with ultraviolet light for 6 seconds by an electrodeless lamp "D bulb" (60 mW/cm$^2$) manufactured by Fusion UV Systems Inc. in an environment with an oxygen concentration of 1000 ppm or less, and the liquid crystalline phase was fixed. As a result, a phase difference layer having a desired front phase difference, that is, a thickness adjusted so as to obtain a desired retardation was obtained.

The retardation of the produced phase difference layer was measured by AxoScan and found to be 127 nm (Example 1).

The cholesteric liquid crystal layer-forming coating liquid 1 is applied to the surface of the obtained phase difference layer at room temperature using a wire bar so that the thickness of the dry film after drying was 0.65 μm, and a coating layer was obtained.

The coating layer was dried at room temperature for 30 seconds and then heated in an atmosphere of 85° C. for 2 minutes. Thereafter, in an environment with an oxygen concentration of 1000 ppm or less, a D valve (90 mW/cm$^2$ lamp) manufactured by Fusion Co., Ltd. was used to emit ultraviolet light at 60° C. and 60% output for 6 to 12 seconds to fix the cholesteric liquid crystalline phase, and a cholesteric liquid crystal layer having a thickness of pin was obtained. This cholesteric liquid crystal layer corresponds to the first selective reflection layer (first selective reflection layer (G reflection layer)).

Next, the same step was repeated using the cholesteric liquid crystal layer-forming coating liquid 2 on a surface of the obtained cholesteric liquid crystal layer, and a layer that is formed of the cholesteric liquid crystal layer-forming coating liquid 2 and has a thickness of 0.8 μm was laminated. This cholesteric liquid crystal layer corresponds to the second selective reflection layer (second selective reflection layer (R reflection layer)).

In this way, a half-mirror with a temporary support, which includes a functional layer including the phase difference layer and the selective reflection layer that includes two cholesteric liquid crystal layers, was obtained. In a case where the reflection spectrum of the half-mirror with a temporary support was measured with a spectrophotometer (manufactured by JASCO Corporation, V-670), a reflection spectrum having a selective reflection center wavelength (center wavelength) at a wavelength of 590 nm and a wavelength of 720 nm was obtained.

Next, the polarization conversion layer-forming coating liquid illustrated in Table 1 is applied on the surface of the obtained cholesteric liquid crystal layer to form polarization conversion layers each of which has a target film thickness illustrated in Table 1.

The polarization conversion layers were formed in the same manner as the cholesteric liquid crystal layer described above.

As a result, the projection image display members with the supports of Examples 1 to and Comparative Examples 4 to 8 illustrated in Table 2 were produced.

In Examples 2 to 15, the film thicknesses of the phase difference layers were changed to differ from Example 1, so that the front phase difference of the phase difference layer was set to 142 nm. In Comparative Example 2, the front phase difference of the phase difference layer was set to 70 nm in the same manner.

In Comparative Examples 1 to 3, projection image display members were similarly produced without forming the polarization conversion layer. Furthermore, in Comparative Example 3, no phase difference layer was formed.

Regarding each level of the obtained long projection image display members, the projection image display member was cut into a size of 250 mm on the short side (length)×280 mm on the long side (width) to obtain a sheet-shaped projection image display member.

<Production of Laminated Glass>

A glass plate (manufactured by Central Glass Co., Ltd., FL2, visible light transmittance of 90%) having a length of 300 mm×a width of 300 mm, and a thickness of 2 mm was prepared.

A PVB film that was cut to the same size as the glass plate was placed on this glass plate as an intermediate film having a thickness of 0.38 mm manufactured by Sekisui Chemical Co., Ltd. A sheet-shaped projection image display member was placed on the intermediate film such that the phase difference layer side was facing up.

A glass plate (manufactured by Central Glass Co., Ltd., FL2, visible light transmittance 90%) having a length of 300 mm×a width of 300 mm, and a thickness of 2 mm was placed on the projection image display member.

This laminate was held at 90° C. and 10 kPa (0.1 atm) for 1 hour, and then heated in an autoclave (manufactured by Kurihara Seisakusho, K.K.) at 115° C. and 1.3 MPa (13 atm) for 20 minutes to remove air bubbles, and thus a laminated glass was obtained.

[Example 16] <Preparation of Silica Particle Dispersion>

AEROSIL RX300 (manufactured by Nippon Aerosil Co., Ltd.) as inorganic fine particles was added to methyl isobutyl ketone (MiBK) so that the concentration of solid contents was 5% by mass, and the mixture was stirred with a magnetic stirrer for 30 minutes. Thereafter, the mixture was subjected to ultrasonic dispersion treatment with an ultrasonic disperser (Ultrasonic Homogenizer UH-600S manufactured by SMT Co., Ltd.) for 10 minutes to produce a silica particle dispersion.

A part of the obtained dispersion was sampled for measuring an average secondary particle diameter, and the average secondary particle diameter of the silica particles in the dispersion was measured using Microtrac MT3000 (manufactured by MicrotracBEL Corp.). As a result, the average secondary particle diameter of the silica particles was 190 nm.

<Preparation of Hardcoat Layer Coating Liquid>

Each of components was mixed to have the following composition, and a hardcoat layer coating liquid having the concentration of solid contents of about 51% by mass was produced.

Composition of Hardcoat Layer Coating Liquid

Dipentaerythritol polyacrylate (six-functional groups)
: A-9550W (manufactured by Shin-Nakamura Chemical Industry Co., Ltd.)
44.8 parts by mass IRGACURE 184: Alkylphenone-based photopolymerization initiator (manufactured by BASF SE)
4 parts by mass 3,4-epoxycyclohexylmethylmethacrylate
: cyclomer M100 (manufactured by Daicel Corporation, molecular weight 196)
22.5 parts by mass Compound 1 0.80 parts by mass Polymer surfactant (manufactured by DAINICHI CHEMICAL INDUSTRY CO., LTD., B1176) 0.05 parts by mass MEK-AC-2140Z (average particle diameter 10 to 20 nm, spherical silica fine particles (manufactured by Nissan Chemical Corporation)) 8.08 parts by mass Tinuvin 928
: benzotriazole-based UV absorber (manufactured by BASF SE)
1.15 parts by mass Silica particle dispersion (MiBK solution concentration 5%)
13 parts by mass The solvent was adjusted to be MEK:MiBK:methyl acetate=32:38:30.

Compound 1:

The above described compound 1 was synthesized by the method described in Example 1 of JP4841935B.

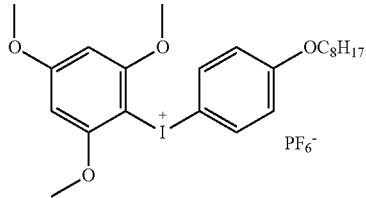

<Formation of Hardcoat Layer>

A hardcoat layer was produced by using the prepared hardcoat layer coating liquid on a surface of the cellulose acylate film having a thickness of 40 μm, on which no reflection layer was formed, in the projection image display member of Example 12.

Specifically, the hardcoat layer coating liquid was applied using a bar at a transport speed of 10 m/min, dried at 60° C. for 150 seconds, and then irradiated with ultraviolet light having an illuminance of 400 mW/cm$^2$ and an irradiation volume of 500 mJ/cm$^2$ using an air-cooled metal halide lamp (manufactured by EYE GRAPHICS CO., LTD.) of 160 W/cm with an oxygen concentration of about 0.1% by volume under nitrogen purging, and the coating layer is cured to form a hardcoat layer.

Therefore, the same projection image display member as in Example 12 was produced except that the hardcoat layer was provided on the surface of the support.

<Film Thickness of Hardcoat Layer>

The film thickness of the hardcoat layer was measured using a contact-type film thickness meter.

Specifically, first, the film thickness of the projection image display member of Example 16 having the hardcoat layer is measured using a contact-type film thickness meter, and the film thickness of the projection image display members of Example 12 was measured in the same manner. Next, the film thickness of the projection image display member of Example 12 having no hardcoat layer is subtracted from the film thickness of the projection image display member of Example 16 having the hardcoat layer to calculate the film thickness of the hardcoat layer. The film thickness of the hardcoat layer was 6.0 μm.

<Production of Member Adhere Inside Wedge-Shaped Glass>

In Example 16, a laminated glass was produced by laminating the projection image display member on a surface of a wedge-shaped glass. The wedge-shaped glass was produced as follows.

In regards to polyvinylbutyral films (S-LEC Film manufactured by Sekisui Chemical Co., Ltd., thickness of 15 mil (0.38 mm)), a thickness distribution was applied by using a roller, as disclosed in Example 2 of JP1990-279437A (JP-H02-279437A). Two polyvinylbutyral films to which the thickness distribution was applied as described above to obtain a wedge shape, and this was interposed between two glass plates (FL2 manufactured by Central Glass Co., Ltd., 300×300 mm, thickness of 2 mm), and an angle formed by a front surface and a rear surface of the glass was set so that the displayed images are not superimposed.

This was held at 90° C. and 10 kPa (0.1 atm) for 1 hour, and then heated in an autoclave (manufactured by Kurihara Seisakusho, K.K.) at 115° C. and 1.3 MPa (13 atm) for 20 minutes to remove air bubbles, and thus a wedge-shaped glass was obtained.

The projection image display member was adhered to the surface of the produced wedge-shaped glass using a UV curable adhesive (UV curable adhesive Exp. U12034-6 manufactured by DIC Corporation). In this case, the projection image display member was adhered such that the phase difference layer side was a side on which the projection light is incident, and the direction of the phase difference layer at an azimuthal angle of 0° was coincided with the vertical direction of the wedge-shaped glass.

[Evaluation of Visible Light Transmittance]

As the visible light transmittance, an A light source visible light transmittance defined in JIS R 3212:2015 (Test methods of safety glazing materials for road vehicles) was determined. The evaluation of the visible light transmittance was carried out according to the following evaluation standard. The results of the visible light transmittance are illustrated in Table 2 below.

Evaluation standard for visible light transmittance
A: 83% or more
B: 80% or more and less than 83%
C: Less than 80%

[Evaluation of Brightness]

p-polarization was caused to be incident on the laminated glass from the direction of the angle of 65° with respect to the normal direction of the laminated glass from the glass surface on the phase difference layer side, and the reflectance spectrum of specularly reflected light thereof is measured with a spectrophotometer (JASCO Corporation, V-670). In the present example, the specularly reflected light is light having an incident angle of 65° with respect to the normal direction that is the opposite side to the incident direction with respect to the normal direction inside the incidence surface.

In this case, the long side direction of the projection image display member was made in parallel to the transmission axis of the incident p-polarization of the spectrophotometer. Therefore, the transmission axis of the phase difference layer is 45° with respect to p-polarization.

According to JIS R 3106, a projection image reflectance was calculated by multiplying the reflectance by a coefficient based on luminosity factor and an emission spectrum of a typical liquid crystal display device in a wavelength range of 380 to 780 nm at intervals of 10 nm, and the projection image reflectance was evaluated as brightness. The brightness was evaluated according to the following evaluation standard. The evaluation results are illustrated in Table 2 below.

Evaluation Standard of Brightness
A: 35% or more
B: 25% or more and less than 35%
C: less than 25%

[Evaluation of Double Image]

Black PET (absorbing material) is attached to the glass surface side of the polarization conversion layer side of the laminated glass, in the same manner as in the evaluation of brightness, p-polarization is incident from the direction of 65°, and the reflectance spectrum of the specularly reflected light is measured with a spectrophotometer (manufactured by JASCO Corporation, V-670).

The double images were evaluated as "[(brightness−brightness with black PET attached)/brightness]×100" as a ratio of reflection by the back surface of the laminated glass to brightness. The evaluation results of the double images are illustrated in Table 2 below.

Evaluation Standard of Double Image
A: less than 4%
B: 4% or more and less than 7%
C: 7% or more

[Evaluation of Suitability for Polarized Sunglasses]

s-polarization was caused to incident on the laminated glass from the direction of the angle of 65° with respect to the normal direction from the glass surface on the polarization conversion layer side of the laminated glass, and the transmittance spectrum of p-polarization of the transmitted light from the opposite surface side of the incidence surface of the laminated glass is measured with a spectrophotometer (JASCO Corporation, V-670).

In this case, a linear polarization plate is disposed on the light receiving portion of the spectrophotometer, and the long side direction of the projection image display member was made in parallel to the transmission axis of the incident p-polarization of the spectrophotometer. Therefore, the transmission axis of the phase difference layer is 45° with respect to p-polarization.

According to JIS R 3106, a visible light transmittance was calculated by multiplying the transmittance by each of a coefficient based on luminosity factor and an emission spectrum of a D65 light source in a wavelength range of 380 to 780 nm at intervals of 10 nm, and the visible light transmittance was evaluated as the suitability for polarized sunglasses. The suitability for polarized sunglasses was evaluated according to the following evaluation standard. The evaluation results of the suitability for polarized sunglasses are illustrated in Table 2 below.

Evaluation Standard of Suitability for Polarized Sunglasses
A+: less than 2%
A: 2% or more and less than 3%
B: 3% or more and less than 5%
C: 5% or more

TABLE 2

| | Polarization conversion layer Expression | | | | | | | Selective reflection layer | | | | Phase difference layer | | Evaluation | | | |
|---|---|---|---|---|---|---|---|---|---|---|---|---|---|---|---|---|---|
| | | | | | | | | First selective reflection layer | | Second selective reflection layer | | | | | | | |
| | (i) | (ii) | (iii) | (iv) | (v) | (vi) | (vii) | Center wavelength | Reflectance | Center wavelength | Reflectance | Front phase difference | Axis angle | Visible light transmittance | Brightness | Double image | Suitability of polarized sunglasses |
| Example 1 | ○ | ○ | ○ | ○ | ○ | ○ | ○ | 590 nm | 15% | 720 nm | 25% | 127 nm | 45° | A | A | A | A+ |
| Example 2 | ○ | ○ | ○ | ○ | ○ | ○ | ○ | 590 nm | 15% | 720 nm | 25% | 142 nm | 45° | A | A | A | A+ |
| Example 3 | ○ | ○ | ○ | ○ | ○ | ○ | ○ | 590 nm | 15% | 720 nm | 25% | 142 nm | 45° | A | A | A | A+ |
| Example 4 | ○ | ○ | ○ | ○ | ○ | ○ | ○ | 590 nm | 15% | 720 nm | 25% | 142 nm | 45° | A | A | A | A+ |
| Example 5 | ○ | ○ | ○ | ○ | x | ○ | x | 590 nm | 15% | 720 nm | 25% | 142 nm | 45° | A | A | A | A |
| Example 6 | ○ | ○ | ○ | ○ | x | x | x | 590 nm | 15% | 720 nm | 25% | 142 nm | 45° | A | A | A | A |
| Example 7 | ○ | ○ | ○ | ○ | x | x | x | 590 nm | 15% | 720 nm | 25% | 142 nm | 45° | A | A | B | B |
| Example 8 | ○ | ○ | ○ | ○ | x | x | x | 590 nm | 15% | 720 nm | 25% | 142 nm | 45° | A | A | B | B |
| Example 9 | ○ | ○ | ○ | ○ | x | x | x | 590 nm | 15% | 720 nm | 25% | 142 nm | 45° | A | A | B | B |
| Example 10 | ○ | ○ | ○ | ○ | x | x | x | 590 nm | 15% | 720 nm | 25% | 142 nm | 45° | A | A | B | B |
| Example 11 | ○ | ○ | ○ | ○ | ○ | ○ | ○ | 590 nm | 15% | 720 nm | 25% | 142 nm | 45° | A | A | A | A+ |
| Example 12 | ○ | ○ | ○ | ○ | ○ | ○ | ○ | 590 nm | 15% | 720 nm | 25% | 142 nm | 45° | A | A | A | A+ |
| Example 13 | ○ | ○ | ○ | ○ | ○ | ○ | ○ | 590 nm | 15% | 720 nm | 25% | 142 nm | 45° | A | A | A | A+ |
| Example 14 | ○ | ○ | ○ | ○ | ○ | ○ | ○ | 590 nm | 15% | 720 nm | 25% | 142 nm | 45° | A | A | A | A+ |
| Example 15 | ○ | ○ | ○ | ○ | ○ | ○ | ○ | 590 nm | 15% | 720 nm | 25% | 142 nm | 45° | A | A | A | A+ |
| Example 16 | ○ | ○ | ○ | ○ | ○ | ○ | ○ | 590 nm | 15% | 720 nm | 25% | 142 nm | 45° | A | A | A | A+ |
| Comparative Example 1 | No polarization conversion layer | | | | | | | 590 nm | 15% | 720 nm | 25% | 127 nm | 45° | A | A | B | C |
| Comparative Example 2 | No polarization conversion layer | | | | | | | 590 nm | 15% | 720 nm | 25% | 70 nm | 45° | A | B | C | B |
| Comparative Example 3 | No polarization conversion layer | | | | | | | 590 nm | 15% | 720 nm | 25% | No phase difference layer | | A | C | C | A |
| Comparative Example 4 | x | x | ○ | ○ | x | x | x | 590 nm | 15% | 720 nm | 25% | 142 nm | 45° | A | A | C | C |
| Comparative Example 5 | x | ○ | ○ | ○ | x | x | ○ | 590 nm | 15% | 720 nm | 25% | 142 nm | 45° | A | A | C | C |
| Comparative Example 6 | ○ | x | x | ○ | x | x | ○ | 590 nm | 15% | 720 nm | 25% | 142 nm | 45° | A | A | C | C |

TABLE 2-continued

| | Polarization conversion layer Expression | | | | | | | Selective reflection layer | | | | Phase difference layer | | Evaluation | | | |
|---|---|---|---|---|---|---|---|---|---|---|---|---|---|---|---|---|---|
| | | | | | | | | First selective reflection layer | | Second selective reflection layer | | Front phase dif-ference | Axis angle | Visible light trans-mittance | Bright-ness | Double image | Suitability of polarized sunglasses |
| | (i) | (ii) | (iii) | (iv) | (v) | (vi) | (vii) | Center wave-length | Reflec-tance | Center wave-length | Reflec-tance | | | | | | |
| Comparative Example 7 | 0 | x | x | ○ | x | x | x | 590 nm | 15% | 720 nm | 25% | 142 nm | 45° | A | A | C | C |
| Comparative Example 8 | 0 | x | x | ○ | x | x | x | 590 nm | 15% | 720 nm | 25% | 142 nm | 45° | A | A | C | C |

As illustrated in Table 2, in Examples 1 to 16, better results were obtained in terms of brightness, double image, and suitability for polarized sunglasses as compared with Comparative Examples 1 to 8, and visible light transmittance, brightness, the effect of suppressing double images, and the suitability of polarized sunglasses were achieved. Particularly, Examples 1 to 4 and Examples 11 to 16 in which the polarization conversion layer satisfies not only Expressions (i) to (iv) but also Expressions (v) to (vii) achieved the more excellent effect of suppressing double images and the suitability for polarized sunglasses.

In Comparative Examples 1 to 3, by removing the polarization conversion layer and reducing the retardation of the phase difference layer, the suitability for polarized sunglasses was improved, but the evaluation results of brightness and double images were poor.

In Comparative Examples 4 to 8, the film thickness and the number of pitches of the polarization conversion layer were not appropriate, and the evaluation results of the double images and the suitability for polarized sunglasses were poor.

The projection image display member can be suitably used for an in-vehicle head-up display system (HUD) or the like.

EXPLANATION OF REFERENCES 10, 10A: projection image display member
11: polarization conversion layer
12: selective reflection layer
12G: first selective reflection layer
12R: second selective reflection layer
14: phase difference layer
15 support
20 head-up display system (HUD)
22: projector
24: windshield glass
30a: surface
28: first glass plate
30 second glass plate
36: intermediate film
38: adhesive layer
D: driver
H: axis
Sa: slow axis
Y: up and down direction

What is claimed is:

1. A projection image display member comprising, in the following order:

at least one phase difference layer;
at least one or more selective reflection layers; and
at least one polarization conversion layer,
wherein the polarization conversion layer is a layer in which a helical alignment structure of a liquid crystal compound is fixed,
the number of pitches x of the helical alignment structure and a film thickness y (unit of μm) of the polarization conversion layer satisfy all of the following Relational Expressions, $$0.3 \leq x \leq 7.0, \quad \text{(i)}$$

$$0.5 \leq y \leq 6.0, \quad \text{(ii)}$$

$$y \leq 0.7x + 3.2, \quad \text{(iii)}$$

and $$y \geq 0.7x - 1.4. \quad \text{(iv)}$$

2. The projection image display member according to claim 1, wherein the number of pitches x of the helical alignment structure and the film thickness y (unit of μm) of the polarization conversion layer satisfy all of the following Relational Expressions, $$0.3 \leq x \leq 1.2, \quad \text{(v)}$$

$$1.0 \leq y \leq 3.0, \quad \text{(vi)}$$

and $$y \geq 1.875x. \quad \text{(vii)}$$

3. The projection image display member according to claim 1, wherein the selective reflection layer has at least one reflectance peak at a wavelength of 500 to 700 nm and at least one reflectance peak at a wavelength of 700 to 900 nm, with respect to incident light having an incident angle of 5°.

4. The projection image display member according to claim 1, wherein the phase difference layer has a front phase difference of 100 to 450 nm at a wavelength of 550 nm.

5. The projection image display member according to claim 1, comprising two or more of the selective reflection layers.

6. The projection image display member according to claim 1, wherein the phase difference layer has a front phase difference of 120 to 200 nm or 300 to 400 nm at a wavelength of 550 nm.

7. The projection image display member according to claim 1, wherein the phase difference layer is a film in which a polymerizable liquid crystal compound is uniaxially aligned and alignment is fixed.

8. A windshield glass comprising:
a first glass plate;
a second glass plate; and
the projection image display member according to claim 1 between the first glass plate and the second glass plate.

9. A head-up display system comprising:
the windshield glass according to claim 8; and
a projector emitting projection light of p-polarization from the phase difference layer side of the projection image display member of the windshield glass.

10. The projection image display member according to claim 1, wherein the polarization conversion layer exhibits optical turning properties and birefringence with respect to visible light.

11. The projection image display member according to claim 1, wherein the two or more of the selective reflection layers have selective reflection center wavelengths different from each other.

12. A projection image display member comprising, in the following order:
at least one phase difference layer;
two or more of selective reflection layers; and
at least one polarization conversion layer,
wherein the polarization conversion layer is a layer in which a helical alignment structure of a liquid crystal compound is fixed,
the number of pitches x of the helical alignment structure and a film thickness y (unit of μm) of the polarization conversion layer satisfy all of the following Relational Expressions, $$0.3 \leq x \leq 7.0, \tag{i}$$

$$0.5 \leq y \leq 6.0, \tag{ii}$$

$$y \leq 0.7x + 3.2, \tag{iii}$$

and $$y \geq 0.7x - 1.4, \tag{iv}$$

the number of pitches x of the helical alignment structure and the film thickness y (unit of μm) of the polarization conversion layer satisfy all of the following Relational Expressions, $$0.3 \leq x \leq 1.2, \tag{v}$$

$$1.0 \leq y \leq 3.0, \tag{vi}$$

and $$y \geq 1.875x, \tag{vii}$$

the polarization conversion layer exhibits optical turning properties and birefringence with respect to visible light, and
the two or more of the selective reflection layers have selective reflection center wavelengths different from each other.

* * * * *